United States Patent
Seo et al.

(10) Patent No.: US 8,817,726 B2
(45) Date of Patent: Aug. 26, 2014

(54) UPLINK TRANSMISSION METHOD AND APPARATUS IN WIRELESS COMMUNICATION SYSTEM

(75) Inventors: Dong Youn Seo, Anyang-si (KR); Min Gyu Kim, Anyang-si (KR); Suck Chel Yang, Anyang-si (KR); Joon Kui Ahn, Anyang-si (KR)

(73) Assignee: LG Electronics Inc., Seoul (KR)

( * ) Notice: Subject to any disclaimer, the term of this patent is extended or adjusted under 35 U.S.C. 154(b) by 204 days.

(21) Appl. No.: 13/387,107

(22) PCT Filed: Jul. 26, 2010

(86) PCT No.: PCT/KR2010/004894
§ 371 (c)(1),
(2), (4) Date: Aug. 6, 2012

(87) PCT Pub. No.: WO2011/013971
PCT Pub. Date: Feb. 3, 2011

(65) Prior Publication Data
US 2013/0034062 A1 Feb. 7, 2013

Related U.S. Application Data

(60) Provisional application No. 61/228,607, filed on Jul. 26, 2009.

(30) Foreign Application Priority Data

Jul. 26, 2010 (KR) .................... 10-2010-0071875

(51) Int. Cl.
*H04L 12/775* (2013.01)
*H04L 12/873* (2013.01)
*H04L 12/18* (2006.01)
*H04L 12/56* (2006.01)
*H04L 12/26* (2006.01)
*H04L 12/40* (2006.01)

(52) U.S. Cl.
CPC ............ *H04L 45/245* (2013.01); *H04L 47/125* (2013.01); *H04L 12/18* (2013.01); *H04L 12/2602* (2013.01); *H04L 12/40026* (2013.01)
USPC ........................................................ 370/329

(58) Field of Classification Search
CPC ..... H04L 45/245; H04L 47/125; H04L 12/18; H04L 12/2602; H04L 12/40026
See application file for complete search history.

(56) References Cited

U.S. PATENT DOCUMENTS 7,885,230 B2 * 2/2011 Seo et al. .................... 370/329
8,009,606 B2 * 8/2011 Seo et al. .................... 370/319
(Continued)

FOREIGN PATENT DOCUMENTS

| JP | 2009-164976 | 7/2009 |
| WO | 2007/084482 | 7/2007 |

(Continued)

OTHER PUBLICATIONS

NTT DoCoMo et al., titled, "Proposed Study Item on Evolved UTRA and UTRAN", by the TSG-RAN Meeting #26, as Agenda Item: 8.12, Document No. RP-040461 in Athens, Greece, Dec. 8-10, 2004, pp. 01 through 05.*

(Continued)

*Primary Examiner* — Andrew Lai
*Assistant Examiner* — Hoyet H Andrews
(74) *Attorney, Agent, or Firm* — Lee, Hong, Degerman, Kang & Waimey

(57) ABSTRACT

The present invention provides an uplink transmission method and apparatus in a wireless communication system. A terminal receives an uplink resource allocation from a base station; and transmits uplink transmission blocks to a PUSCH (physical uplink shared channel) by using the uplink resource allocation. The uplink resource allocation indicates an allocated RBs (resource blocks) within a subframe that includes a plurality of RBs. The subframe is divided into at least one PUCCH (physical uplink control channel) area for PUCCHs and a plurality of PUSCH (physical uplink shared channel) area for PUSCHs, wherein the PUCCH area is arranged between the plurality of PUSCH regions.

19 Claims, 23 Drawing Sheets

(56) References Cited

U.S. PATENT DOCUMENTS

| | | | |
|---|---|---|---|
| 8,320,319 B2* | 11/2012 | Lohr et al. | 370/329 |
| 8,411,633 B2* | 4/2013 | Seo et al. | 370/329 |
| 2009/0175231 A1 | 7/2009 | Seo et al. | |
| 2011/0134861 A1* | 6/2011 | Seo et al. | 370/329 |
| 2012/0057545 A1* | 3/2012 | Hariharan et al. | 370/329 |
| 2012/0147831 A1* | 6/2012 | Golitschek | 370/329 |
| 2012/0182914 A1* | 7/2012 | Hariharan et al. | 370/311 |
| 2013/0010720 A1* | 1/2013 | Lohr et al. | 370/329 |
| 2013/0016676 A1* | 1/2013 | Lohr et al. | 370/329 |
| 2013/0028212 A1* | 1/2013 | Lohr et al. | 370/329 |
| 2013/0039202 A1* | 2/2013 | Feuersanger et al. | 370/252 |
| 2013/0201939 A1* | 8/2013 | Zhang et al. | 370/329 |
| 2013/0201940 A1* | 8/2013 | Zhang et al. | 370/329 |
| 2013/0208605 A1* | 8/2013 | Bautista et al. | 370/252 |

FOREIGN PATENT DOCUMENTS

| | | |
|---|---|---|
| WO | WO 2007084482 A2 * | 7/2007 |
| WO | 2008/137786 | 11/2008 |

OTHER PUBLICATIONS

3GPP TR 25_814 V7_1_0 (Sep. 2006)_Technical Report_3rd Generation Partnership Project_Technical Specification Group Radio Access Network_Physical layer aspects for evolved Universal Terrestrial Radio Access (UTRA) (Release 7), pp. 1-132.*

Qualcomm Europe, titled, "Considerations on Multiplexing of Control and User Data for xFDMA based E-UTRA Uplink Evaluation", was presented as Agenda item: 8.2, 3GPP TSG-RAN WG1 #42bis, Document No. R1-051102, Oct. 10-14, 2005, in San Diego, CA, USA, pp. 1-6.*

NTT DoCoMo et al., titled, "Multiplexing Method of Shared Control Channel in Uplink Single-Carrier FDMA Radio Access", was presented as Agenda Item: 8.2, TSG-RAN WG1 #42bis, Document No. R1-051143, having (Original R1-050591), in San Diego, USA, Oct. 10-14, 2005, pp. 1-8.*

Panasonic, titled, "Mapping position of control channel for Uplink SC-FDMA", was presented as Agenda Item: 8.1, TSG-RAN WG1 #43, Document No. R1-051395, in Seoul, Korea, Nov. 7-11, 2005, pp. 1-6.*

Huawei, titled, "Further considerations on multiplexing method of shared Control Channel in Uplink Single-Carrier FDMA", was presented as Agenda item: 8.1, TSG-RAN WG1 #43, Document No. R1-051430, in Seoul, Korea, Nov. 7-11, 2005, pp. 1-6.*

Samsung, titled "Data and Control Channel Multiplexing in SC-FDMA for EUTRA Uplink", was presented as Agenda item: 8.1, 3GPP TSG RAN WG1 Meeting #43, Document No. R1-051343, in Seoul, Korea, Nov. 7-11, 2005, pp. 1-2.*

Zhang, Guodong et al. (hereinafter referred to as Zhang), International Publication No. WO 2007/084482 A2, titled Methods and Apparatus for Mapping an Uplink Control Channel to a Physical Channel in a Single Carrier Frequency Dnision Multiple Access System, having a publication date of Jul. 26, 2007.*

3GPP TR 25.814 V7.1.0 (Sep. 2006), titled "Technical Report 3rd Generation Partnership Project Technical Specification Group Radio Access Network Physical layer aspects for evolved Universal Terrestrial Radio Access (UTRA) (Release 7)", (3GPP hereinafter) was presented as Technical Report, 3GPP TR 25.814, having Document No. 3GPP TR 25.814 V7.1.0.*

3GPP TSG RAN WG1 Meeting #56bis R1-091194, titled "Resource Allocation and Downlink Control Channel Structure for Relay Backhaul Link", Document for Discussion:, (R1-091194 hereinafter) was presented at 3GPP TSG RAN WG1 Meeting #56, having Document No. R1-091194, dated Mar. 23-27, 2009, pp. 1-7.*

* cited by examiner

FIG. 14
(A)
mirroring on                    mirroring off
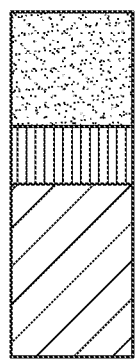
(B)
mirroring on                    mirroring off
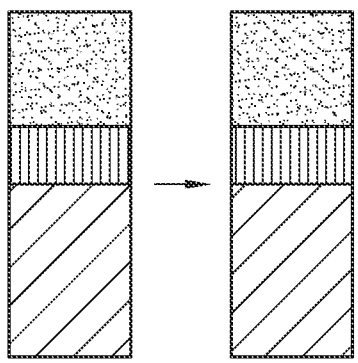

UPLINK TRANSMISSION METHOD AND APPARATUS IN WIRELESS COMMUNICATION SYSTEM

CROSS-REFERENCE TO RELATED APPLICATIONS

This application is the National Stage filing under 35 U.S.C. 371 of International Application No. PCT/KR2010/004894, filed on Jul. 26, 2010, which claims the benefit of earlier filing date and right of priority to Korean Application No. 10-2010-0071875, filed on Jul. 26, 2010, and also claims the benefit of U.S. Provisional Application Ser. No. 61/228,607, filed on Jul. 26, 2009, the contents of which are all incorporated by reference herein in their entirety.

TECHNICAL FIELD

The present invention relates to wireless communications, and more particularly, to an uplink transmission apparatus and method in a wireless communication system and an uplink resource allocation apparatus and method.

BACKGROUND ART $3^{rd}$ generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas.

In 3GPP LTE, a resource block (RB) is used as a basic unit of resource allocation. The RB includes a plurality of subcarriers and a plurality of orthogonal frequency division multiplex (OFDM) symbols. The RB can be divided into a physical resource block (PRB) and a virtual resource block (VRB). According to a rule of mapping to the PRB, the VRB is divided again into a localized VRB (LVRB) and a distributed VRB (DVRB).

The VRB is used in resource allocation for downlink transmission or uplink transmission. In downlink transmission, a base station (BS) reports to a user equipment (UE) a specific VRB through which a downlink data packet is transmitted. In uplink transmission, the BS reports a specific VRB through which the UE transmits an uplink data packet.

A data transmission scheme can be divided into a frequency diversity scheduling (FDS) scheme which obtains a performance gain by using frequency diversity and a frequency selective scheduling (FSS) scheme which obtains a performance gain by using frequency selective scheduling.

In the FDS scheme, a transmitter transmits a data packet to subcarriers distributed in a frequency domain. That is, symbols in the data packet experiences channel fading in the frequency domain. By preventing all symbols in the data packet from experiencing unfavorable fading, reception performance is improved.

In the FSS scheme, the transmitter transmits a data packet by using one or a plurality of contiguous subcarriers in a favorable fading state in the frequency domain.

In a wireless communication system, a plurality of UEs are present in one cell, and a radio channel condition for each UE has a different characteristic. Therefore, even in the same subframe, one UE may need to use the FDS scheme and another UE may need to use the FSS scheme. Accordingly, it is necessary to design such that the FDS scheme and the FSS scheme can be multiplexed effectively in one subframe. The FSS scheme has a gain only when a band favored for the UE is selectively used in an overall band. On the other hand, the FDS scheme does not require selective transmission for a specific frequency band as long as a frequency interval capable of obtaining sufficient diversity is maintained, irrespective of whether the specific band is good or bad.

The FDS scheme uses the DVRB since data is transmitted by using subcarriers distributed in the frequency domain. The FSS scheme uses the LVRB since data is transmitted by using contiguous subcarriers in the frequency domain.

In recent years, there is an ongoing discussion on 3GPP LTE-advanced (LTE-A) that is an evolution of the 3GPP LTE. The 3GPP LTE-A ensures backward compatibility with the 3GPP LTE, and supports a wideband by using carrier aggregation.

3GPP LTE-A has a frequency band supporting compatibility with 3GPP LTE and an additional frequency band not supporting compatibility with 3GPP LTE. Therefore, there is a need for an uplink transmission method and resource allocation method using the additional frequency band.

SUMMARY OF INVENTION

Technical Problem

The present invention provides an uplink transmission method and apparatus using an additional frequency band in a wireless communication system.

The present invention also provides an uplink resource allocation method and apparatus for an additional frequency band.

Technical Solution

In an aspect, an uplink transmission method in a wireless communication system is provided. The method includes receiving, by a user equipment, an uplink resource allocation from a base station, and transmitting, by the user equipment, an uplink transport block on a physical uplink shared channel (PUSCH) by using the uplink resource allocation. The uplink resource allocation indicates an allocated resource block (RB) in a subframe including a plurality of RBs. The subframe is split into at least one physical uplink control channel (PUCCH) region for a PUCCH and a plurality of physical uplink shared channel (PUSCH) regions for a PUSCH, and the PUCCH region is arranged between the plurality of PUSCH regions.

The method may further include receiving, by the user equipment, a hopping offset indicating a size of the PUCCH region from the base station.

The method may further include receiving, by the user equipment, an additional offset indicating a start point of the PUCCH region from the base station.

The uplink resource allocation may include a resource indication value (RIV) indicating the number of allocated RBs and a start point of the allocated RB.

The number of allocated RBs may include the number of RBs belonging to the PUCCH region.

The number of allocated RBs may not include the number of RBs belonging to the PUCCH region.

The plurality of RBs may be grouped in unit of a resource block group (RBG), and the uplink resource allocation indicates allocated RBGs.

In another aspect, a user equipment includes a radio frequency (RF) unit for transmitting and receiving a radio signal, and a processor, operatively coupled to the RF unit, for performing uplink transmission and configured to receive an uplink resource allocation from a base station and transmit an uplink transport block on a physical uplink shared channel (PUSCH) by using the uplink resource allocation. The uplink resource allocation indicates an allocated resource block (RB) in a subframe including a plurality of RBs. The subframe is split into at least one physical uplink control channel (PUCCH) region for a PUCCH and a plurality of physical uplink shared channel (PUSCH) regions for a PUSCH, and the PUCCH region is arranged between the plurality of PUSCH regions.

In still another aspect, a base station includes a radio frequency (RF) unit for transmitting and receiving a radio signal and a processor, operatively coupled to the RF unit, for allocating an uplink resource and configured to determine an allocated resource block (RB) in a subframe including a plurality of RBs, and transmit an uplink resource allocation regarding the allocated RB to a user equipment. The subframe is split into at least one physical uplink control channel (PUCCH) region for a PUCCH and a plurality of physical uplink shared channel (PUSCH) regions for a PUSCH, and the PUCCH region is arranged between the plurality of PUSCH regions.

Advantageous Effects

According to the present invention, resource allocation information required for scheduling can be effectively implemented when there is an additional frequency band not supporting compatibility with a basic frequency band supporting compatibility with a legacy user equipment.

DESCRIPTION OF DRAWINGS

FIG. 14 shows an example of mirroring.

MODE FOR INVENTION

A user equipment (UE) may be fixed or mobile, and may be referred to as another terminology, such as a mobile station (MS), a mobile terminal (MT), a user terminal (UT), a subscriber station (SS), a wireless device, a personal digital assistant (PDA), a wireless modem, a handheld device, etc.

A base station (BS) is generally a fixed station that communicates with the UE and may be referred to as another terminology, such as an evolved node-B (eNB), a base transceiver system (BTS), an access point, etc.

Each BS provides a communication service to a specific geographical region (generally referred to as a cell). The cell can be divided into a plurality of regions (referred to as sectors).

Hereinafter, a downlink (DL) denotes a communication link from the BS to the UE, and an uplink (UL) denotes a communication link from the UE to the BS. In the DL, a transmitter may be a part of the BS, and a receiver may be a part of the UE. In the UL, the transmitter may be a part of the UE, and the receiver may be a part of the BS.

Figure 1:
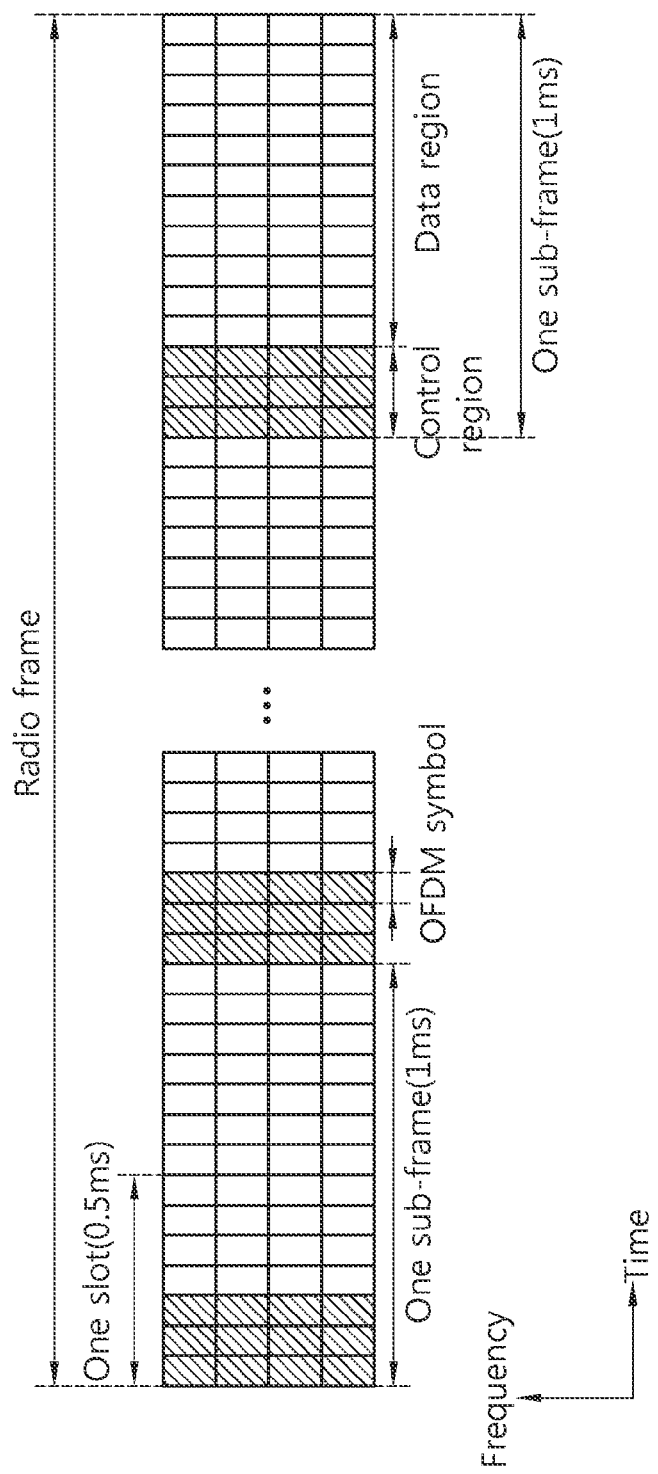
FIG. 1 shows a downlink radio frame structure in $3^{rd}$ generation partnership project (3GPP) long term evolution (LTE).

FIG. 1 shows a DL radio frame structure in $3^{rd}$ generation partnership project (3GPP) long term evolution (LTE). The section 6 of 3GPP TS 36.211 V8.5.0 (2008-12) "Evolved Universal Terrestrial Radio Access (E-UTRA); Physical Channels and Modulation (Release 8)" may be incorporated herein by reference. A radio frame consists of 10 subframes indexed from 0 to 9. One subframe consists of 2 slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink, the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V8.5.0 (2008-12), in case of a normal CP, one subframe includes 7 OFDM symbols, and in case of an extended CP, one subframe includes 6 OFDM symbols.

A subframe is divided into a control region and a data region in the time domain. The control region includes up to three preceding OFDM symbols of a $1^{st}$ slot in the subframe. The number of OFDM symbols included in the control region may vary. A physical downlink control channel (PDCCH) is allocated to the control region, and a physical downlink shared channel (PDSCH) is allocated to the data region.

As disclosed in 3GPP TS 36.211 V8.5.0 (2008-12), the LTE classifies a physical channel into a data channel, i.e., a physical downlink shared channel (PDSCH) and a physical uplink shared channel (PUSCH), and a control channel, i.e., a physical downlink control channel (PDCCH), a physical control format indicator channel (PCFICH) and a physical hybrid-ARQ indicator channel (PHICH), and a physical uplink control channel (PUCCH).

The PCFICH transmitted in a $1^{st}$ OFDM symbol in the subframe carries a control format indicator (CFI) regarding the number of OFDM symbols (i.e., a size of the control region) used for transmission of control channels in the subframe. The UE first receives the CFI through the PCFICH, and thereafter monitors the PDCCH.

The PHICH carries a positive acknowledgement (ACK)/negative-acknowledgement (NACK) signal for uplink hybrid automatic repeat request (HARQ). The ACK/NACK signal for UL data transmitted by the UE is transmitted through the PHICH.

Control information transmitted through the PDCCH is referred to as downlink control information (DCI). The DCI may include resource allocation of the PDSCH (this is referred to as a DL grant), resource allocation of a PUSCH (this is referred to as a UL grant), a set of transmit power control commands for individual UEs in any UE group and/or activation of a voice over Internet protocol (VoIP).

The DCI on the PDCCH is received by using blind decoding. A plurality of candidate PDCCHs can be transmitted in the control region of one subframe. The UE monitors the plurality of candidate PDCCHs in every subframe. Herein, monitoring is an operation in which the UE attempts decoding of each PDCCH according to a format of PDCCH to be monitored. The UE monitors a set of PDCCH candidates in a subframe to find its own PDCCH. For example, if there is no cyclic redundancy check (CRC) error detected by performing de-making on an identifier (i.e., cell-radio network temporary identifier (RNTI)) of the UE in a corresponding PDCCH, the UE detects this PDCCH as a PDCCH having the DCI of the UE.

The control region in the subframe includes a plurality of control channel elements (CCEs). The CCE is a logical allocation unit used to provide the PDCCH with a code rate depending on a wireless channel. The CCE corresponds to a plurality of resource element groups (REGs). The REG includes a plurality of REs. According to a relation between the number of CCEs and the code rate provided by the CCEs, the PDCCH format and a possible number of bits of the PDCCH are determined.

Figure 2:
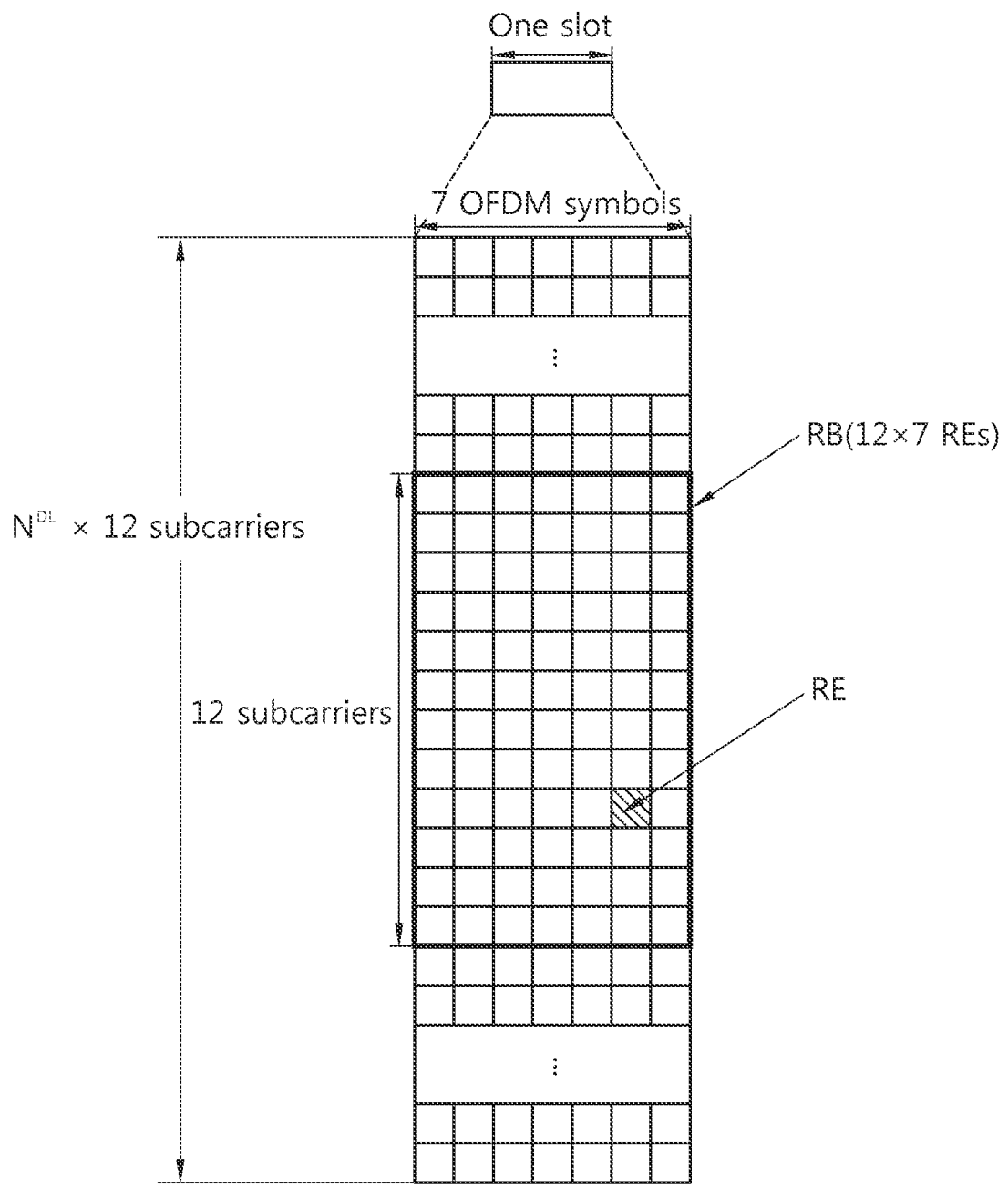
FIG. 2 shows an example of a resource grid for one downlink slot.

FIG. 2 shows an example of a resource grid for one DL slot. A UL slot is also configured in the same manner as the DL slot.

The DL slot includes a plurality of OFDM symbols in a time domain. A resource block (RB) is a resource allocation unit, and includes a plurality of subcarriers in one slot. It is described herein that one DL slot includes 7 OFDM symbols and one RB includes 12 subcarriers for exemplary purposes only, and the present invention is not limited thereto.

Each element on the resource grid is referred to as a resource element (RE), and one RB includes 12×7 REs. The number $N^{DL}_{RB}$ of RBs included in the DL slot depends on a transmission bandwidth determined in a cell.

The following terminologies are defined.

A resource element (RE) is a smallest frequency-time unit by which a modulation symbol of a data channel or a modulation symbol of a control channel is mapped. If there are M subcarriers on one OFDM symbol and if one slot includes N OFDM symbols, then one slot includes M×N REs.

A physical resource block (PRB) is a unit frequency-time resource for transmitting data. One PRB consists of a plurality of contiguous REs in a frequency-time domain, and a plurality of PRBs are defined in one subframe.

A virtual resource block (VRB) is a virtual unit resource for transmission of the data channel or the control channel. The number of REs included in one VRB is equal to the number of REs included in one PRB. For transmission of the data channel or the control channel, one VRB can be mapped to the PRB or one VRB can be mapped to a plurality of PRBs.

A localized virtual resource block (LVRB) is one type of the VRB. One LVRB is mapped to one PRB, and there is no overlapping of PRBs to which different LVRBs are mapped. The LVRB can be interpreted directly as the PRB.

A distributed virtual resource block (DVRB) is another type of the VRB. One DVRB is mapped to some REs in a plurality of PRBs, and there is no overlapping of REs which are mapped to different DVRBs.

The following parameters are defined.

'$N_D$' denotes the number of PRBs to which one DVRB is mapped. The DVRB can be divided into $N_D$ segments, and then each segment can be mapped to a different PRB.

'$N_{PRB}$' denotes the number of PRBs in the system.

'$N_{LVRB}$' denotes the number of available LVRBs in the system.

'$N_{DVRB}$' denotes the number of available DVRBs in the system.

'$N^{UE}_{LVRB}$' denotes the maximum number of LVRBs allocated to a UE.

'$N^{UE}_{DVRB}$' denotes the maximum number of DVRBs allocated to one UE.

'$N_{subset}$' denotes the number of subsets.

round(x) is a function for outputting an integer by rounding off x. ceil(x) is a function for outputting a minimum value among integers equal to or greater than x. floor(x) is a function for outputting a maximum value among integers equal to or less than x.

Now, VRB-PRB mapping in 3GPP LTE will be described.

Figure 3:
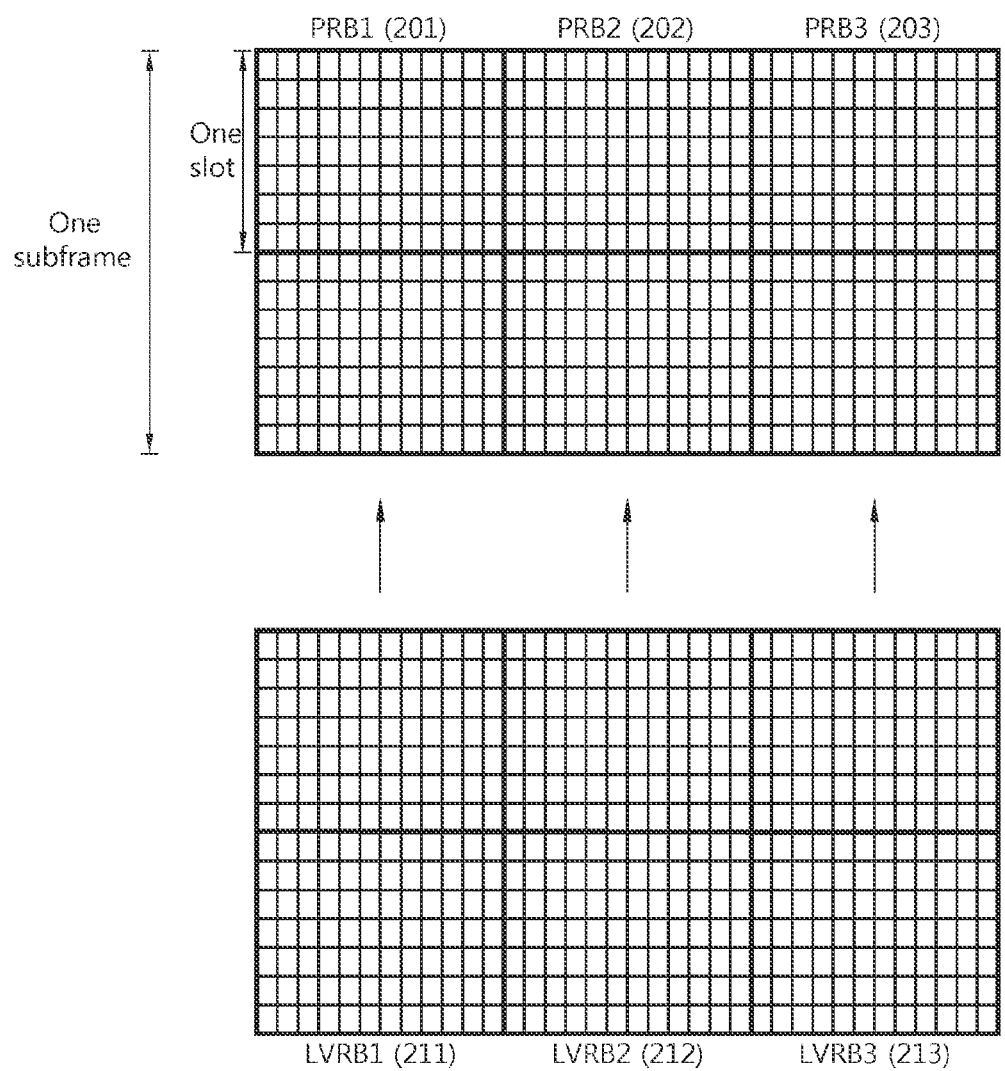
FIG. 3 shows localized virtual resource block (LVRB)-physical resource block (PRB) mapping.

FIG. 3 shows LVRB-PRB mapping. Although is it shown herein that an LVRB and a PRB each include 12 subcarriers in a subframe and one subframe includes 12 OFDM symbols, the number of OFDM symbols included in the subframe and the number of subcarriers included therein are for exemplary purposes only.

An LVRB1 211 is mapped to a PRB1 201. An LVRB2 212 is mapped to a PRB2 202. An LVRB3 213 is mapped to a PRB3 203. The LVRB is one-to-one mapped to the PRB. An LVRB having an index i corresponds to a PRB having an index j. According to a VRB allocation scheme, i and j may be equal to or different from each other.

Figure 4:
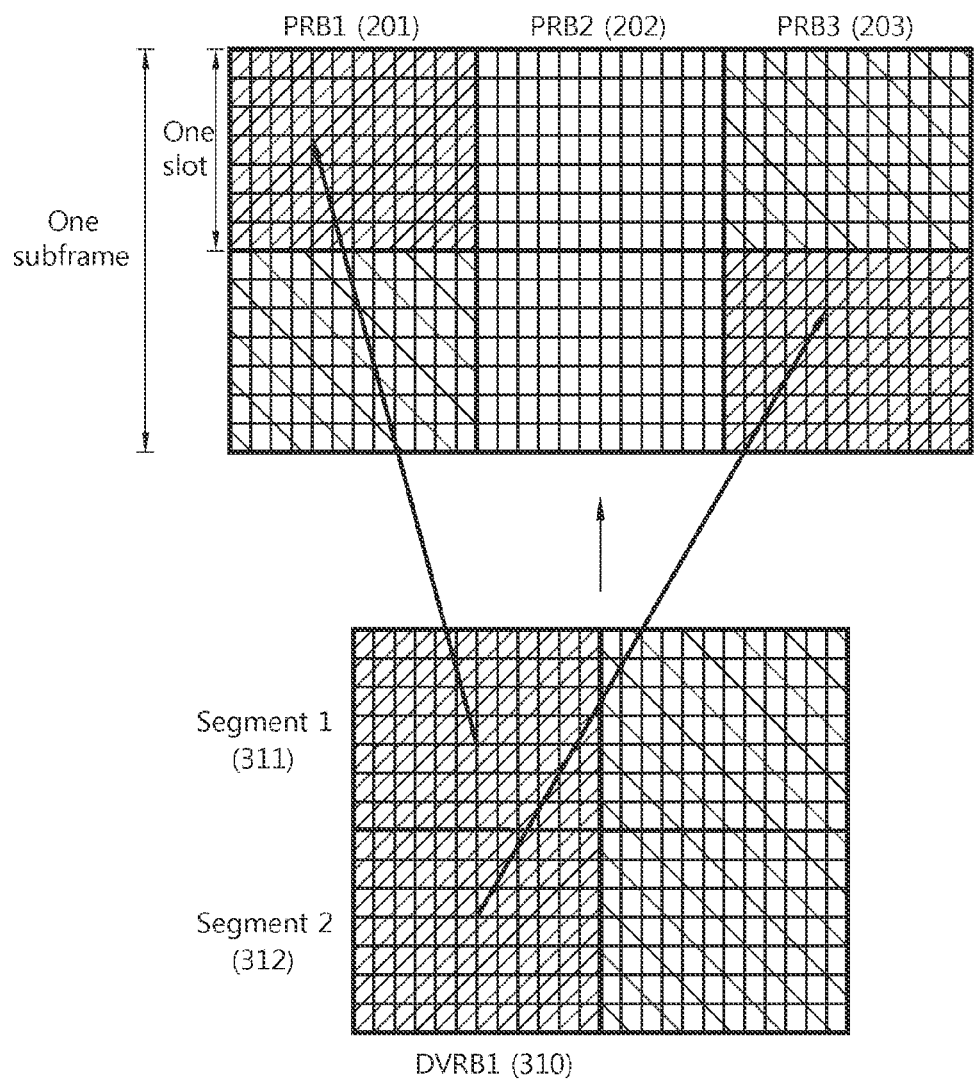
FIG. 4 shows distributed virtual resource block (DVRB)-PRB mapping.

FIG. 4 shows DVRB-PRB mapping. A DVRB is divided into $N_D$ segments in a frequency domain. Each segment is mapped to a plurality of PRBs.

Herein, $N_D$=2. A DVRB 310 is divided into a segment1 311 and a segment2 312. The two segments are respectively mapped to a PRB1 301 and a PRB3 303.

Figure 5:
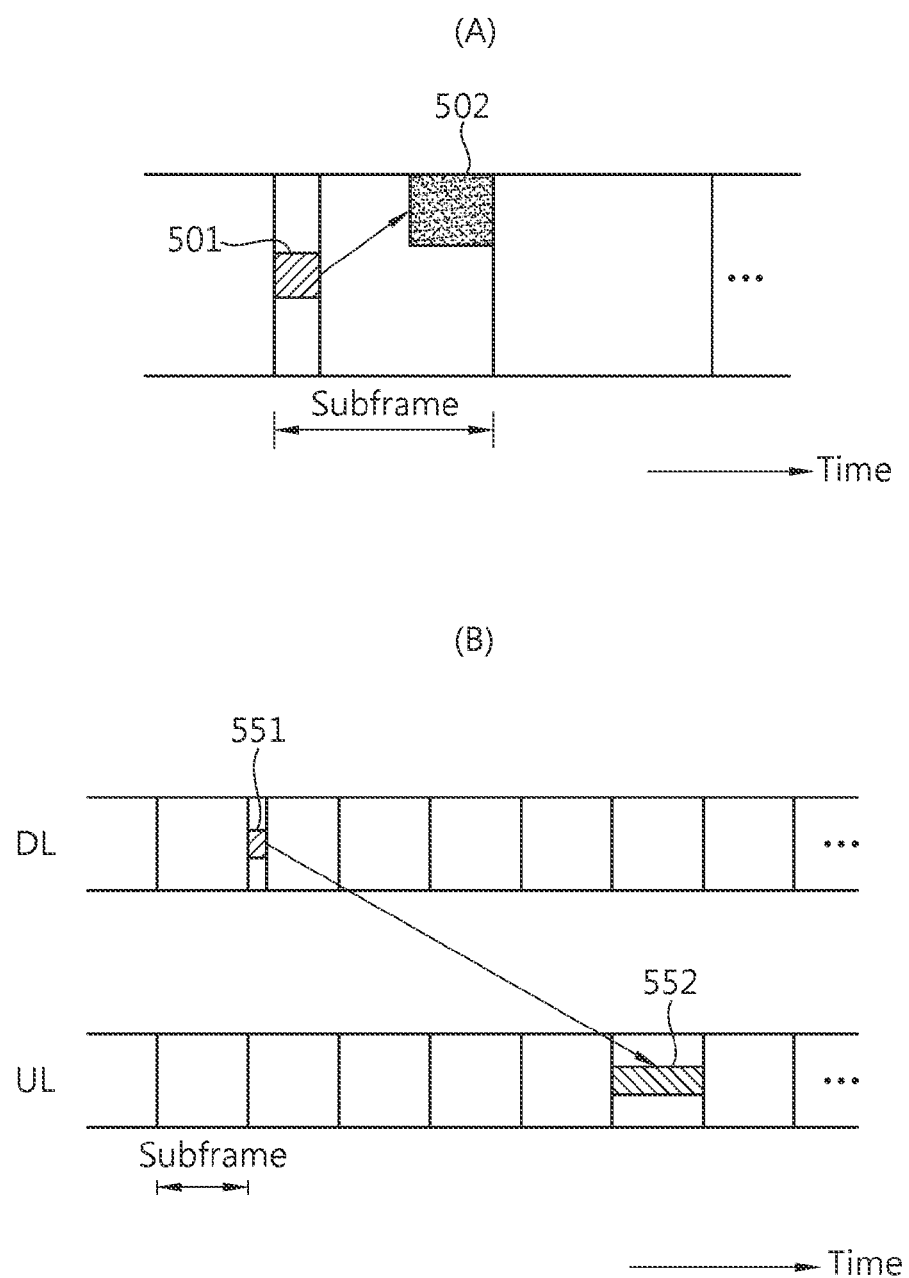
FIG. 5 shows resource allocation in 3GPP LTE.

FIG. 5 shows resource allocation in 3GPP LTE. FIG. 5A shows a DL resource allocation, and FIG. 5B shows a UL resource allocation.

For DL data reception, a UE monitors a PDCCH, and receives the DL resource allocation on a PDCCH 501. The DL resource allocation includes a VRB allocation for a PDSCH 502. The UE receives a DL transport block on the PDSCH 502 indicated by the DL resource allocation. The UE acquires a VRB mapped to a PRB, on which the PDSCH 502 is transmitted, on the basis of the VRB allocation and thus receives the DL transport block.

For UL data transmission, the UE monitors the PDCCH in a DL subframe and receives the UL resource allocation on a PDCCH 551. The DL resource allocation includes a VRB allocation for a PUSCH 552. The UE transmits a UL transport block on the PUSCH 552 configured based on the UL resource allocation. The UE maps the VRB allocated based on the VRB allocation to a PRB, and transmits the PUSCH 552 by using the mapped PRB.

As described above, by receiving the VRB allocation on the PDCCH from a BS, the UE can determine a PRB for receiving the DL transport block or for transmitting the UL transport block. In this case, it is assumed that the VRB allocation consists of a typical bitmap. If there are $N_{RB}$ VRBs, $N_{RB}$ bits are required for the bitmap. This may result in a problem in that a size of a payload of DCI transmitted on the PDCCH is increased in proportion to the number of VRBs.

Therefore, to decrease overhead of the VRB allocation, as disclosed in the section 7.1.6 of 3GPP TS 36.213 V8.5.0 (2008-12), the VRB allocation is classified into a type 0, a type 1, and a type 2, and a resource block group (RBG) and a subset are introduced.

Figure 6:
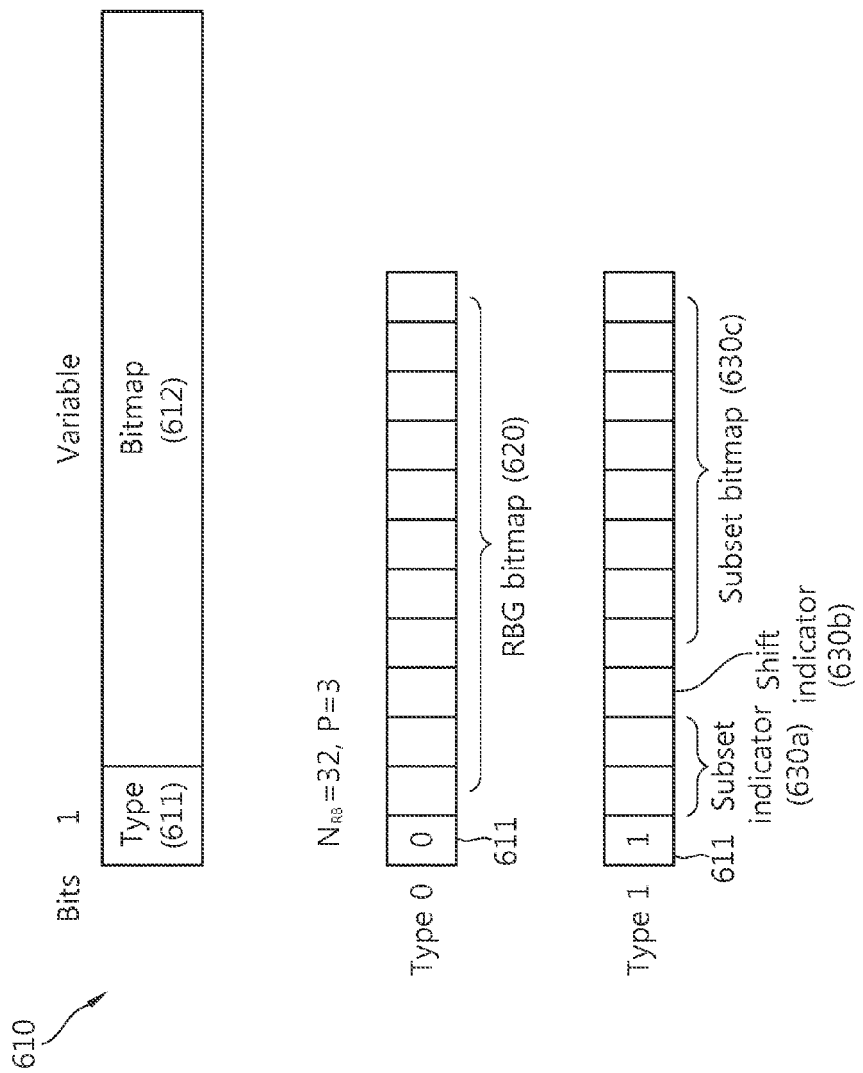
FIG. 6 shows an example of virtual resource block (VRB) allocation.

FIG. 6 shows an example of VRB allocation. A VRB allocation 610 includes a type field 611 and a bitmap field 612. The type field 611 is a 1-bit field that indicates a type of the VRB allocation. The bitmap field 612 includes bitmap information depending on the type of the VRB allocation.

If the type field 611 is set to '0', a type-0 VRB is allocated. The bitmap field 612 for the type-0 VRB allocation includes an RBG bitmap 620. An RBG is allocated in a basic unit when allocating the type-0 VRB. The RBG includes one or a plurality of contiguous VRBs. An RBG size P indicates the number of LVRBs included in the RBG.

Table 1 shows the RBG size P depending on the number of RBs.

TABLE 1

| $N_{RB}$ | RBG size (P) |
|---|---|
| ≤10 | 1 |
| 11~26 | 2 |
| 27~63 | 3 |
| 64~110 | 4 |

The RBG bitmap 620 has a size of L=ceil($N_{RB}$/P). Therefore, if $N_{RB}$=32, the P=3, and the RBG bitmap 620 has a size of L=11.

Each bit of the RBG bitmap 620 corresponds to the RBG. When $N_{RB}$=32, the number of bits required for the bitmap for allocation resources in the unit of one RB is 32 bits in total. However, if the resource is allocated in the unit of an RBG in which 3 RBs are grouped, only an 11-bit RBG bitmap is required and thus the payload size can be decreased. However, it has a disadvantage in that resource allocation cannot be achieved in a unit equal to or less than the RBG size.

If the type field 611 is set to '1', it is a type-1 VRB allocation. The bitmap field 612 for the type-1 VRB allocation includes a subset indicator 630a, a shift indicator 630b, and a subset bitmap 630c. In the type-1 VRB allocation, the subset includes a plurality of RBGs, and all RBs are divided into P subsets.

The subset indicator 630a indicates a subset selected from the P subsets. The shift indicator 630b indicates a shift of resource allocation in the subset. Each bit of the subset bitmap 630c indicates a VRB in the selected subset.

If $N_{RB}$=32 and three (P=3) subsets are used, the shift indicator 630b is 2 bits. The shift indicator 630b can be set to one bit. A size of the subset bitmap 630c is equal to (L−the number of bits of the subset indicator 630a−the number of bits of the shift indicator 630b).

Figure 7:
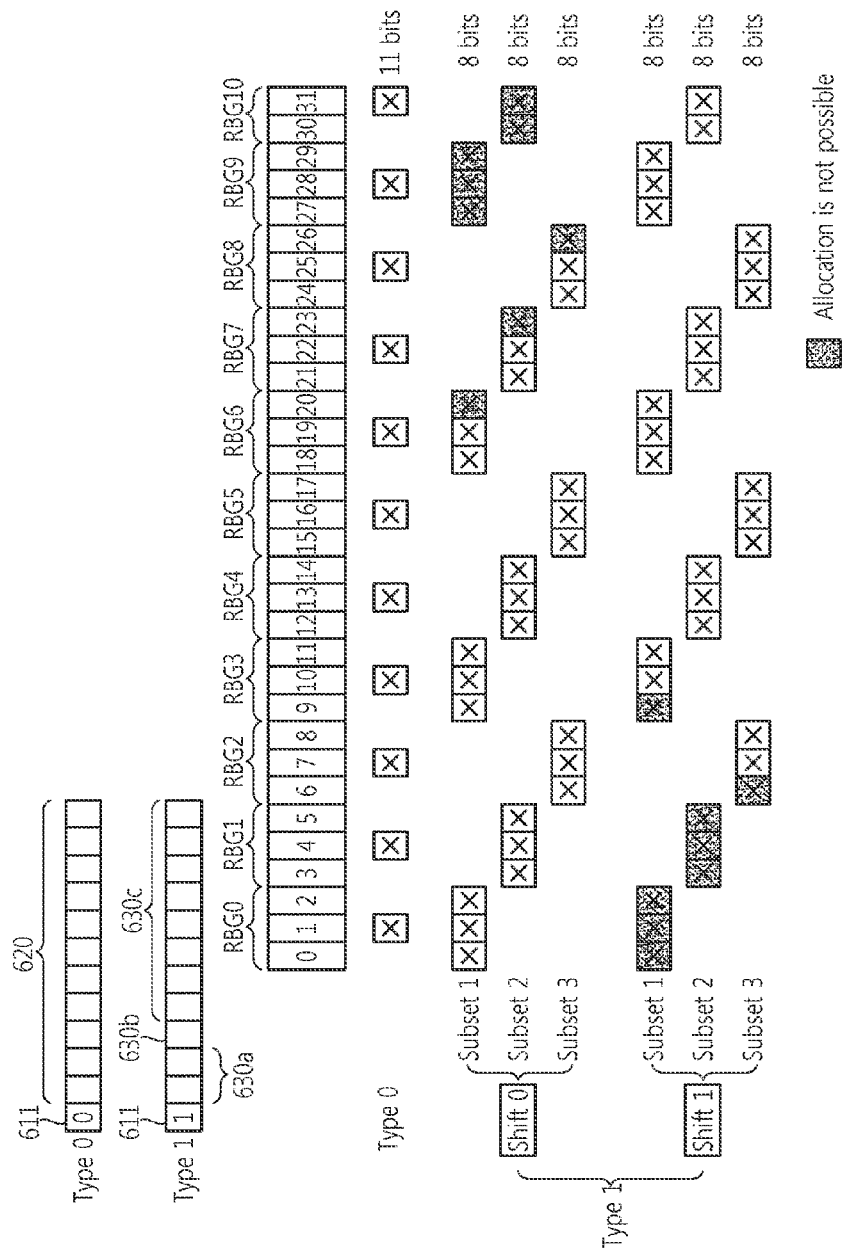
FIG. 7 shows a type-0 VRB allocation and a type-1 VRB allocation.

FIG. 7 shows a type-0 VRB allocation and a type-1 VRB allocation. Herein, $N_{RB}$=$N_{RPB}$=32, and there are PRB indices 0 to 31. Since P=3, there are 11 RBGs, i.e., RBG0 to RBG10.

In the type-0 VRB allocation, the RBG bitmap 620 is 11 bits. Bits of the RBG bitmap 620 respectively correspond to 11 RBGs.

In the type-1 VRB allocation, since there are three subsets, the respective RBGs are sequentially allocated to the subsets. Therefore, a subset 1 includes 12 RBs (i.e., RB0, RB1, RB2, RB9, RB10, RB11, RB18, RB19, RB20, RB27, RB28, RB29), a subset 2 includes 11 RBs (i.e., RB3, RB4, RB5, RB12, RB13, RB14, RB21, RB22, RB23, RB30, RB31), and a subset 3 includes 9 RBs (i.e., RB6, RB7, RB8, RB15, RB16, RB17, RB24, RB25, RB26).

Since the subset bitmap 630c is only 8 bits, some RBs among the RBs of each subset cannot be indicated by the subset bitmap 630c. For example, among the 12 RBs in the subset 1, four RBs (i.e., RB20, RB27, RB28, RB29) cannot be indicated by the subset bitmap 630c. This implies that 4 RBs cannot be allocated. Likewise, among the 11 RBs in the subset 2, three RBs (i.e., RB23, RB30, RB31) cannot be indicated by the subset bitmap 630c. Among the 9 RBs in the subset 3, one RB (i.e., RB 26) cannot be indicated by the subset bitmap 630c.

To solve this problem, the shift indicator 630b is used. For example, if it is assumed that the subset indicator 630a indicates a subset 1 and the shift indicator 630b is set to '0', then the subset bitmap 630c is used to indicate RB0, RB1, RB2, RB9, RB10, RB11, RB18, RB19 (see 1504). If the subset indicator 630a indicates the subset 1 and the shift indicator 630b is set to '1', the subset bitmap 630c is used to indicate RB10, RB11, RB18, RB19, RB20, RB27, RB28, RB29.

In addition to the type 0 and the type 1, there is a type-2 VRB allocation. The type-2 VRB allocation does not include the type field 611.

Figure 8:
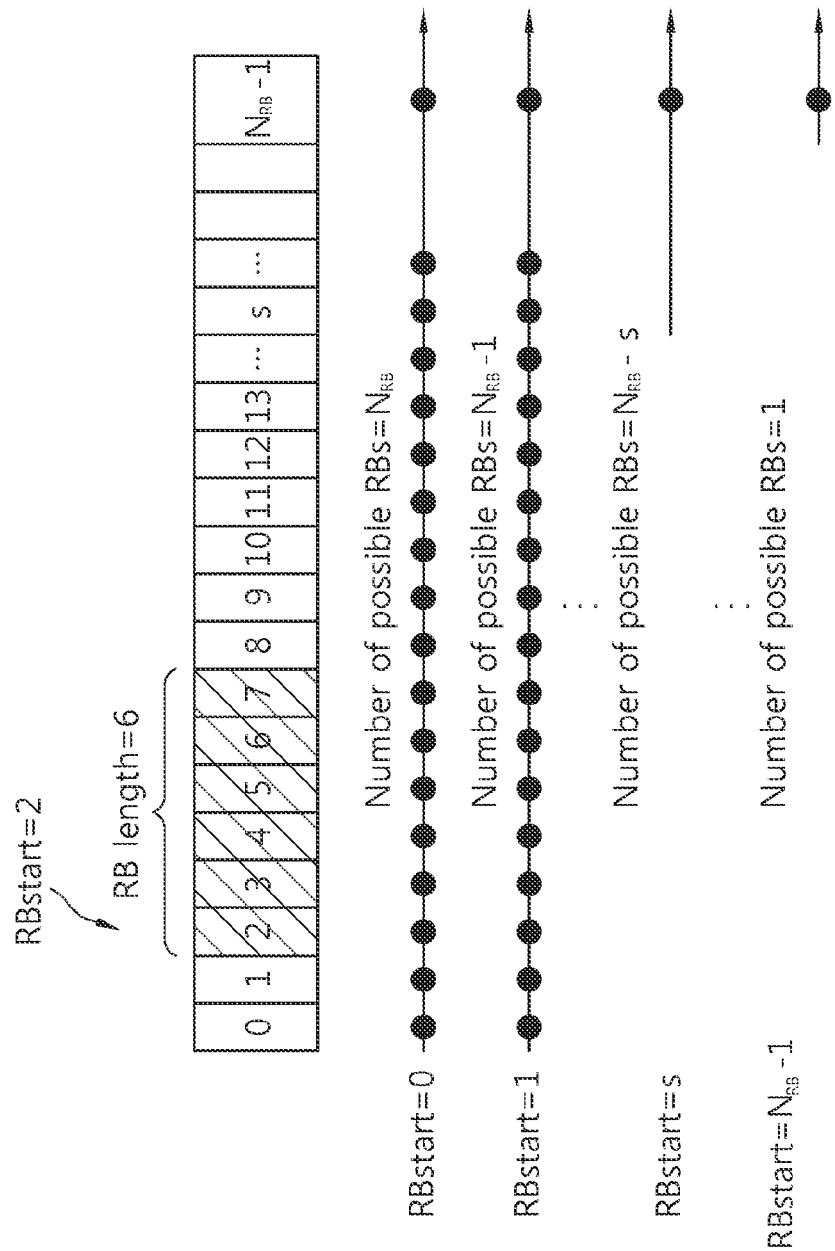
FIG. 8 shows a type-2 VRB allocation.

FIG. 8 shows a type-2 VRB allocation. The type-2 VRB allocation is allocation of a plurality of contiguous VRBs to a UE. To indicate an RB to be allocated, a start RB index and the number of contiguous RBs are required. However, in the type 2, the number of RBs is predetermined depending on a start point to decrease the number of combinations.

Referring to FIG. 8, if an RB start point is an RB with an index 0, the number of possible RB is $N_{RB}$. If the RB start point is an RB with an index 1, the number of possible RBs is $N_{RB}$−1. If the RB start point is an RB with an index s, the number of possible RBs is $N_{RB}$−s. If the RB start point is an RB with an index $N_{RB}$−1, the number of possible RBs is 1.

The type-2 VRB allocation includes a resource indication value (RIV) for designating the RB start point and the number of RBs. The number of allocation combinations is $N_{RB}(N_{RB}+1)/2$, and the number of bits of the RIV is ceil[log 2{$N_{RB}(N_{RB}+1)/2$}]. If $N_{RB}$=32, the RIV can be indicated with 10 bits.

The type-0 VRB allocation and the type-1 VRB allocation are used for LVRB allocation. The type-2 VRB allocation can be used for DVRB allocation or LVRB allocation.

Figure 9:
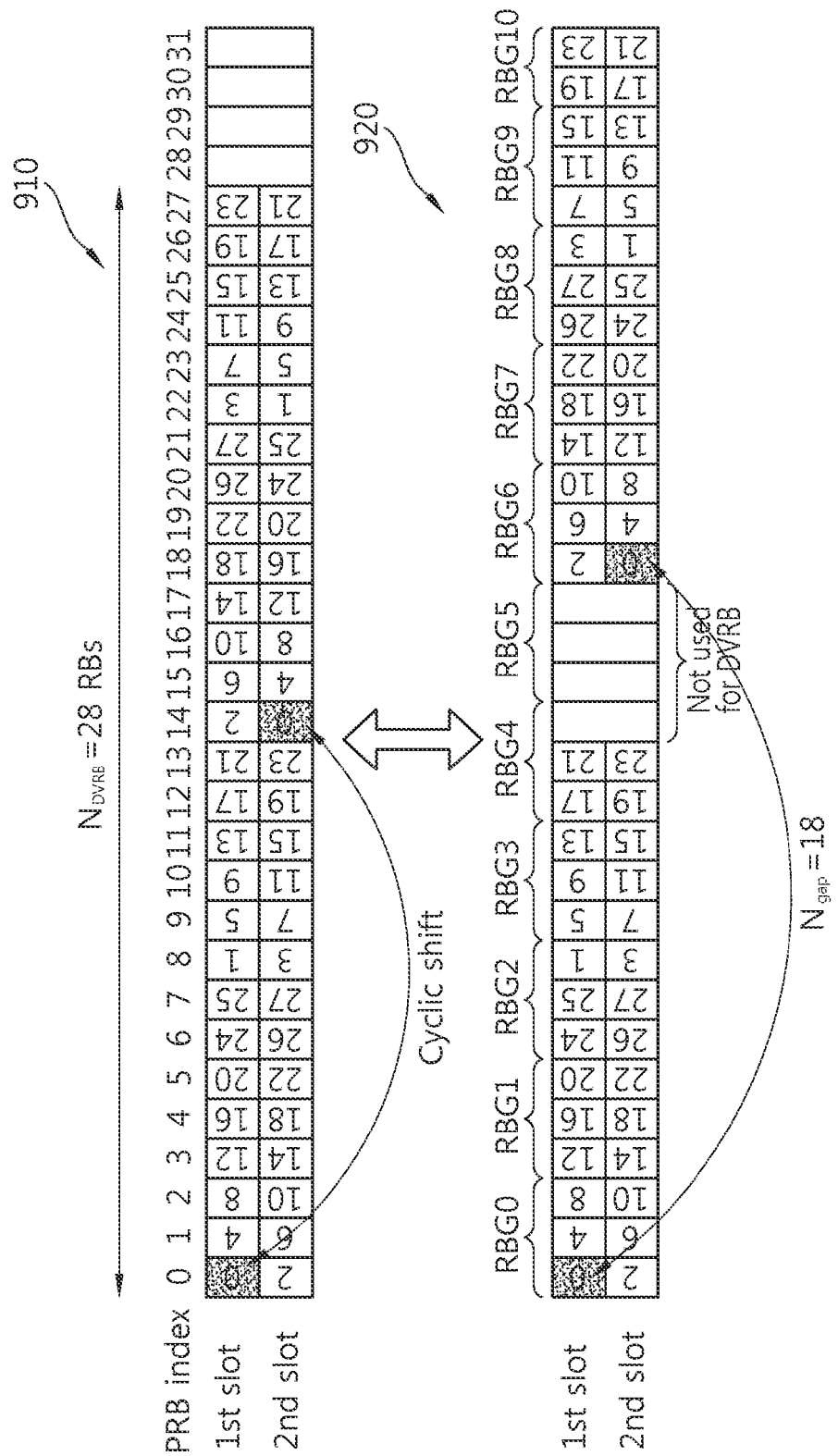
FIG. 9 shows an example of DVRB-PRB mapping.

FIG. 9 shows an example of DVRB-PRB mapping. It is assumed herein that $N_{RB}$=$N_{RPB}$=32, and PRB indices are numbered from 0 to 31. Upper mapping 910 is an example of not applying a gap. Lower mapping 920 is an example of applying the gap. A number written in a box indicates a DVRB index mapped to a PRB of a corresponding slot.

First, an RBG size P is determined according to a system bandwidth (i.e., $N_{RB}(=N_{PRB})$, the number of RBs) as shown in Table 1. Further, a gap size $N_{gap}$ is determined as shown in Table 2 below.

TABLE 2

| $N_{RB}$ | $N_{gap}$ |
|---|---|
| 6-10 | ceil($N_{RB}/2$) |
| 11 | 4 |
| 12-19 | 8 |
| 20-26 | 12 |
| 27-44 | 18 |
| 45-49 | 27 |
| 50-63 | 27 |
| 64-79 | 32 |
| 80-110 | 48 |

The gap size $N_{gap}$ can be obtained according to an equation: $N_{gap}=\text{round}(N_{RB}/2P^2)P^2$.

$N_{DVRB}=2\min(N_{gap}, N_{RB}-N_{gap})$, i.e., the number of DVRBs, is determined on the basis of the number $N_{RB}$ of RBs and the gap size $N_{gap}$.

In this example, P=3 and $N_{gap}$=18 since $N_{RB}=N_{RPB}$=32. Therefore, $N_{DVRB}$=28.

According to the gap size $N_{gap}$, a size of a block interleaver for mapping a DVRB index to a PRB index is determined.

Figure 10:
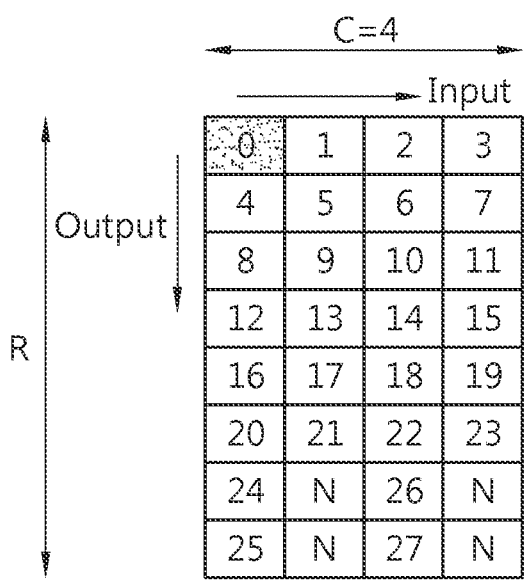
FIG. 10 shows an example of a block interleaver.

FIG. 10 shows an example of a block interleaver. The number C of columns of the block interleaver is fixed to 4, and the number R of rows thereof is determined to R=ceil($N_{DVRB}/(C*P)$)P. Therefore, R=8. 'N' indicates a null value. The null value is used to match the number of DVRB indices to the size of the block interleaver, and is inserted to last $\{(4R-N_{DVRB})/2\}$ columns of a $2^{nd}$ row and a $4^{th}$ row.

When an input of the block interleaver is a DVRB index, the DVRB index is filled in a row-first manner. That is, after the DVRB index is completely input to the first row, a row index is increased by 1 and is then input to a next row. An output of the block interleaver is filled in a column-first manner. That is, after the first column is completely output, a column index is increased by one and then a next column is output.

The block interleaver is for mapping a plurality of contiguous DVRB indices to a PRB index in a distributed manner. According to the block interleaver of FIG. 10, an input DVRB index 0→1→2→3→4→5 is distributed to an output PRB index 0→4→8→12→16.

Referring back to FIG. 9, the interleaved DVRB index output from the block interleaver is mapped sequentially to the PRB index.

Regarding the upper mapping 910, in a $1^{st}$ slot, an output DVRB index of the block interleaver is mapped sequentially to a PRB index. In a $2^{nd}$ slot, in order to give frequency diversity to the DVRB index mapped to the $1^{st}$ slot, the DVRB index is cyclically shifted by $N_{DVRB}/N_D$ and is mapped to the PRB index.

If $N_D$=2, $N_{DVRB}/N_D$=14. Therefore, although a DVRB index 0 is mapped to a PRB index 0 in the $1^{st}$ slot, a DVRB index 1 is cyclically shifted and is mapped to a PRB index 14 in the $2^{nd}$ slot.

A gap is applied to obtain a higher frequency diversity gain. The lower mapping 920 is an example of applying a gap size to the upper mapping 910. That is, a total of 28 RBs are divided into a $1^{st}$ group and a $2^{nd}$ group, and the $2^{nd}$ group is shifted by the gap size and is then mapped to a PRB index. Since a start point of the gap size is a PRB index at which the $1^{st}$ group starts, a $1^{st}$ PRB index to which a $1^{st}$ DVRB index of the $2^{nd}$ group is mapped is defined by being separated by the gap size from the PRB index at which the $1^{st}$ group starts.

In the lower mapping 920, (a $1^{st}$ DVRB index of the $1^{st}$ slot, a $1^{st}$ DVRB index of the $2^{nd}$ slot) of the $2^{nd}$ group is (2,0). Before applying the gap size, (2,0) is mapped to the PRB index 14. When the gap size is applied, (2,0) is mapped to a PRB index 18.

By applying the gap size, the $1^{st}$ group and the $2^{nd}$ group are separated from each other by $N_{offset}$. Herein, $N_{offset}=N_{gap}-N_{DVRB}/2$=4. Therefore, between the $1^{st}$ group and the $2^{nd}$ group, there are $N_{offset}$ PRBs to which the DVRB is not mapped. Accordingly, the DVRB is not mapped to a PRB having a PRB index 14, 15, 16, and 17.

By performing DVRB-PRB mapping described above, a diversity order becomes 4, and thus a diversity gain can be obtained.

Figure 11:
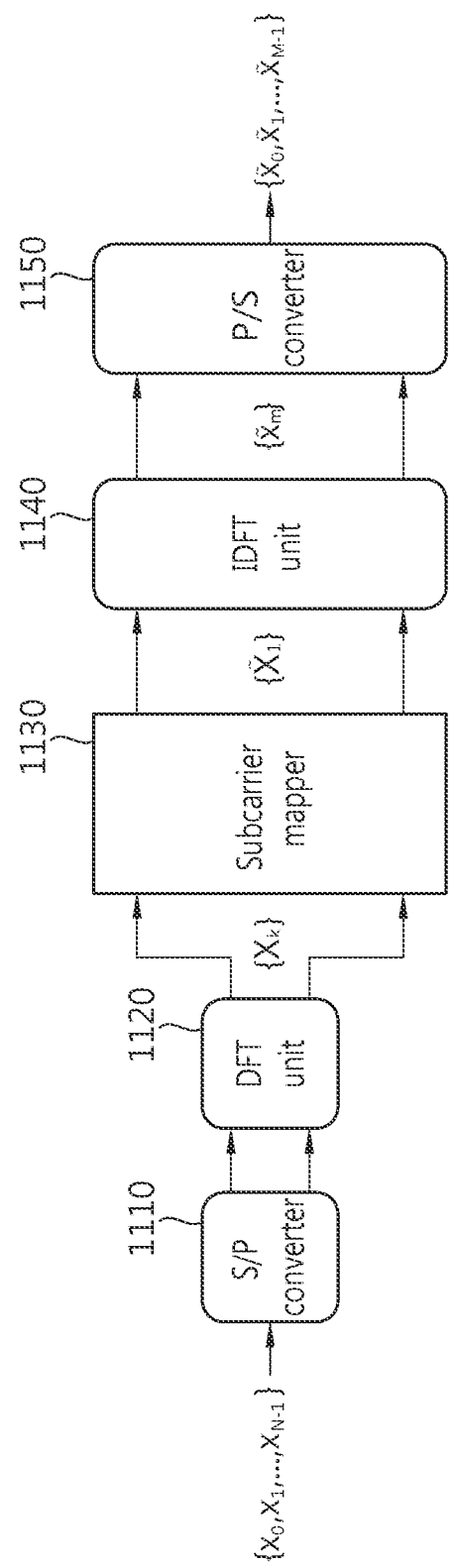
FIG. 11 shows an example of signal processing for single carrier frequency division multiple access (SC-FDMA).

FIG. 11 shows an example of signal processing for SC-FDMA.

N data symbols $\{x_1, x_1, \ldots, x_{N-1}\}$ are input to a serial-to-parallel (S/P) converter 1110. A discrete Fourier transform (DFT) unit 1120 performs N-sized DFT to spread the data symbols.

A subcarrier mapper 1130 maps the DFT-spread data symbols to subcarriers. Although the data symbols are mapped to contiguous subcarriers in uplink transmission of 3GPP LTE, they can be mapped to non-contiguous subcarriers on a cluster basis.

After mapping to the subcarriers, IFFT is performed by an inverse discrete Fourier transform (IDFT) unit 1140.

The IDFT-converted data symbols are converted into transport symbols via a parallel-to-serial (P/S) converter 1150.

In 3GPP LTE, a DFT size is limited to a multiple of 2, 3, and 5 by considering complexity of DFT. Therefore, when one RB consists of 12 subcarriers, since $12=3\times2^2$, the number of RBs scheduled to a UE is limited to a multiple 2, 3, and 5. This is called a resource allocation condition of Radix-2,3,5.

Discrete resource allocation is performed when using a bitmap method based on DVRB mapping and RBG configuration. To maintain a single-carrier property, contiguous resource allocation (i.e., type-2 VRB allocation) of LVRB is supported in an uplink of 3GPP LTE. In addition, for transmission using frequency diversity, hopping of contiguous resources between slots or subframes is supported.

Figure 12:
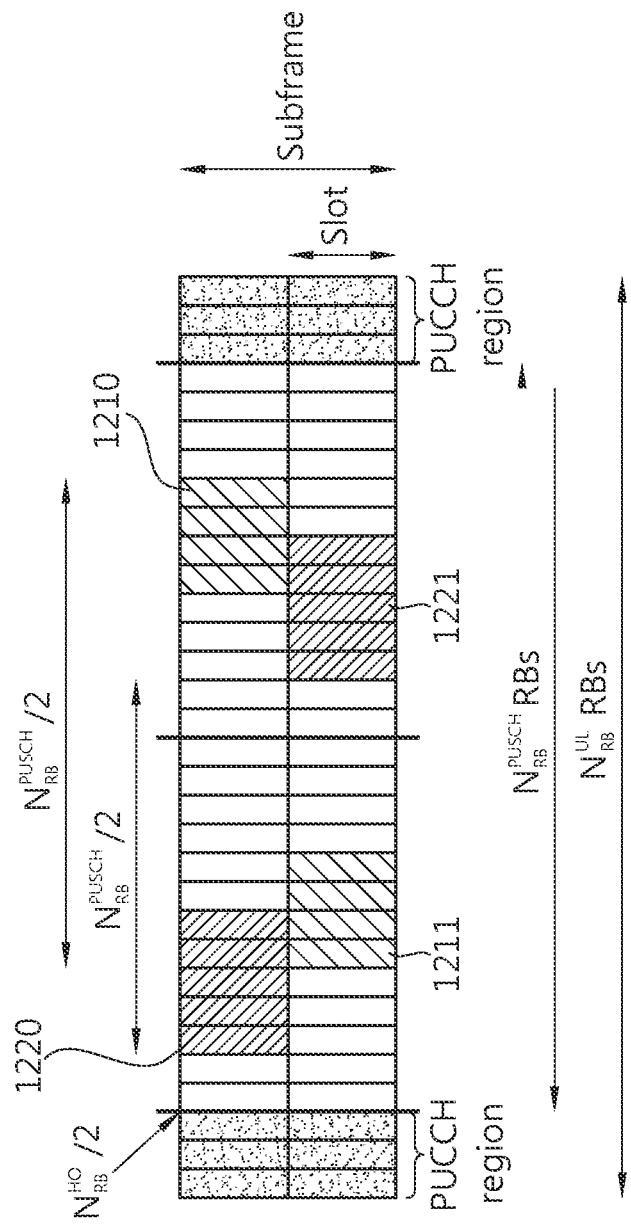
FIG. 12 shows a hopping type 1 in 3GPP LTE.

FIG. 12 shows a hopping type 1 in 3GPP LTE. $N^{UL}_{RB}$ denotes the total number of RBs in a UL subframe. $N^{PUSCH}_{RB}$ denotes the number of RBs that can be allocated to a PUSCH. A PUCCH region for a PUCCH is located at both ends of the UL subframe. A PUSCH region for a PUSCH is located in a center portion of the UL subframe.

When using the hopping type 1, a $1^{st}$ resource 1210 of a $1^{st}$ slot is allocated in a UL grant, and a $2^{nd}$ resource 1211 of a $2^{nd}$ slot is allocated by being shifted by a PUSCH offset from the $1^{st}$ resource 1210. Although it is shown that the PUSCH offset is $N^{PUSCH}_{RB}/2$, the PUSCH offset may be $N^{PUSCH}_{RB}/4$.

Likewise, a $3^{rd}$ resource 1220 of the $1^{st}$ slot is allocated in the UL grant, and a $4^{th}$ resource 1221 of the $2^{nd}$ slot is allocated by being shifted by the PUSCH offset $N^{PUSCH}_{RB}/2$ from the $3^{rd}$ resource 1220.

A PUCCH region (i.e., a control region) is a portion reserved for PUCCH transmission, and is a region ranging from an end of a frequency band of a subframe to ceil($N^{HO}_{RB}/2$). A hopping offset $N^{HO}_{RB}$ is an offset used for PUSCH frequency hopping, and is indicated by the number of RBs. The hopping offset $N^{HO}_{RB}$ denotes a size of the control region. The hopping offset is reported by a UE to a BS by using a higher layer message. Although the PUCCH region is reserved for PUCCH transmission, it can be allocated to the UE so as to be used in PUSCH transmission.

Although a case where $N^{HO}_{RB}=6$ and $N^{UL}_{RB}=32$ is shown for example, the number of RBs is not limited thereto.

Figure 13:
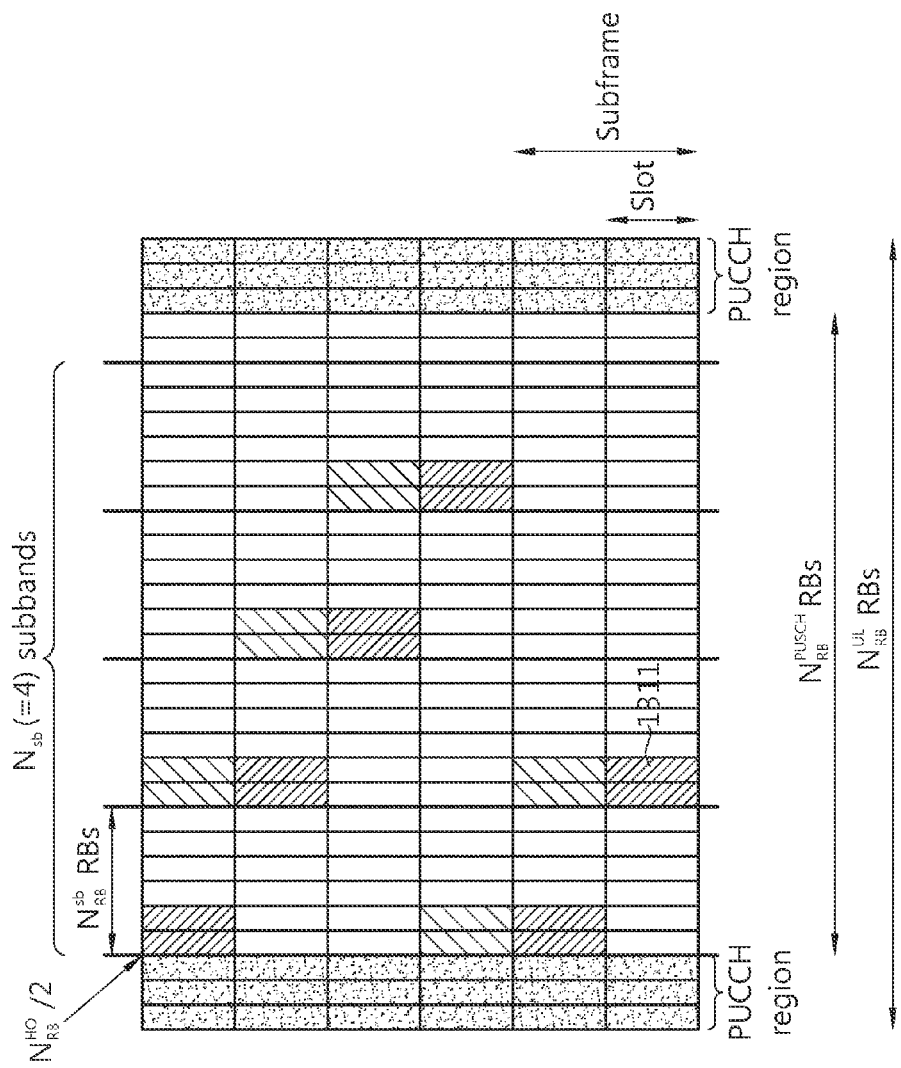
FIG. 13 shows a hopping type 2 in 3GPP LTE.

FIG. 13 shows a hopping type 2 in 3GPP LTE. A PUSCH region (i.e., a data region) is split into $N_{sb}$ subbands. $N^{sb}_{RB}$ denotes the number of RBs included in the subband. Although it is shown that $N_{sb}=4$ and $N^{sb}_{RB}=6$ herein, the present invention is not limited to a particular range.

Hopping is performed on a subband basis. That is, a resource is allocated in a next slot by changing a subband.

Assume that contiguous VRB indices are allocated using an initial UL grant. Allocated RBs 1311 are mapped to a PRB by using contiguous VRB indices according to a predetermined hopping rule. The allocated RBs 1311 are shifted for each slot according to a mapping rule on a subband basis.

Since a subband has a shuffling effect for each slot or subframe, even if contiguous resources are allocated in a specific slot, when allocation is achieved across subbands, resources can be split discretely due to movement of a subband in a subsequent slot. Therefore, only continuous resource allocation is allowed in a subband in order to maintain a single-carrier property.

FIG. 14 shows an example of mirroring. 3GPP LTE can apply mirroring on a subband basis within a subframe in order to increase a diversity gain.

If mirroring is 'On', a VRB index of a $2^{nd}$ slot is arranged in a reserve order of a VRB index of a $1^{st}$ slot. As a result, a PRB is mapped in a reserve order. That is, resources in the $1^{st}$ slot and the $2^{nd}$ slot in a subband are mapped as if the resources are reflected from a mirror.

Subband hopping and mirroring are determined through higher layer signaling, and are configured to operate according to a predetermined pattern.

Now, a multiple carrier system is described.

To support a higher data rate, a multiple carrier system supporting a plurality of component carriers (CCs) is taken into account.

Spectrum aggregation (or bandwidth aggregation, also referred to as carrier aggregation) supports a plurality of CCs. The CC is defined with a center frequency and a bandwidth. For example, when 5 CCs are allocated with a granularity of a carrier unit having a bandwidth of 20 MHz, a bandwidth of up to 100 MHz can be supported.

Figure 15:
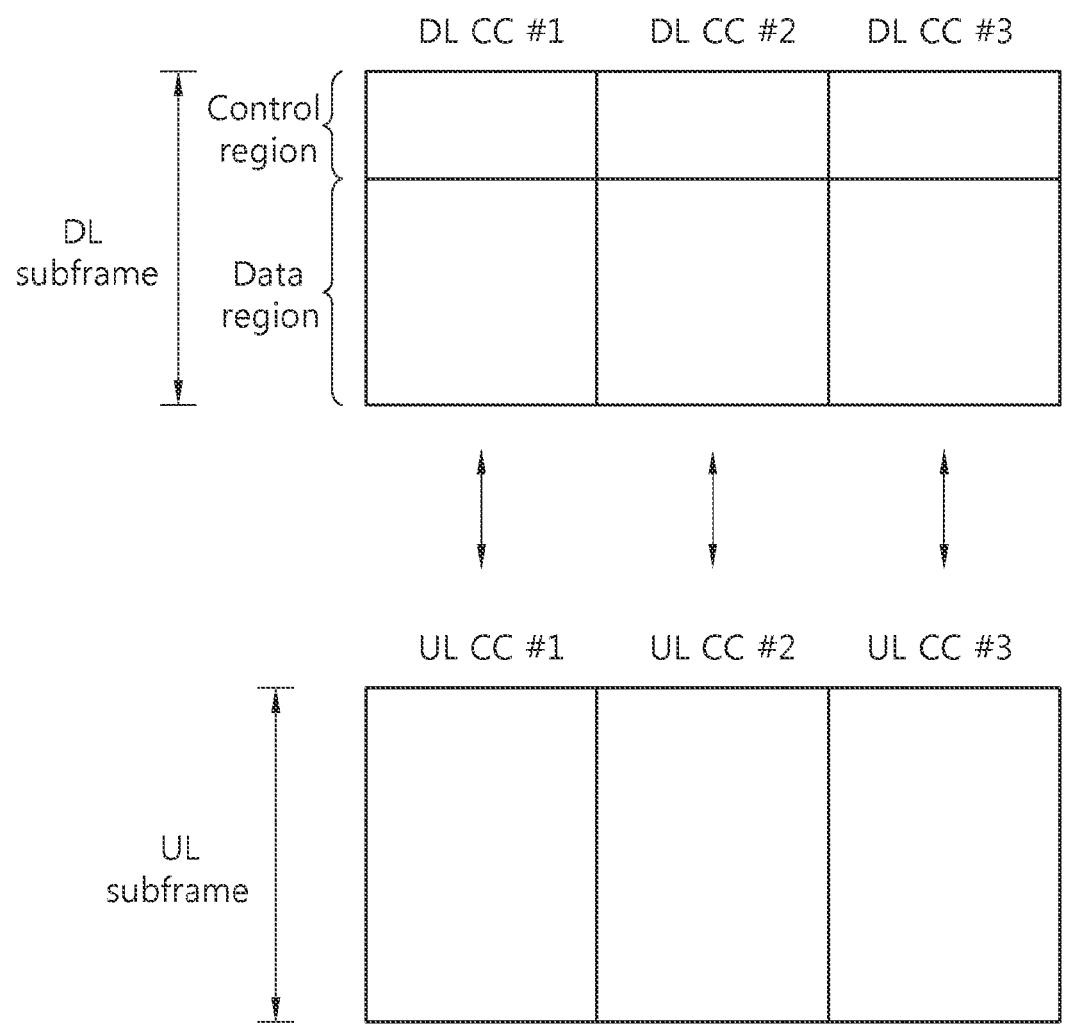
FIG. 15 shows an example of multiple carriers.

FIG. 15 shows an example of multiple carriers. Although there are three DL CCs and three UL CCs in the figure, the number of DL CCs and the number of UL CCs are not limited thereto. A PDCCH and a PDSCH are independently transmitted in each DL CC. A PUCCH and a PUSCH are independently transmitted in each UL CC.

A UE can concurrently monitor a plurality of DL CCs, and can receive DL data. However, even if a BS operates M DL CCs, N DL CCs can be allocated to the UE. In addition, the BS can be configured such that L DL CCs are preferentially monitored and received by the UE. Herein, L≤N≤M.

To increase resource efficiency in each CC, frequency resource expansion is taken into account. A frequency resource in the CC includes a basic frequency resource providing compatibility with the legacy 3GPP LTE and an extended frequency resource extended from the basic frequency resource. The basic frequency resource is a resource used by a legacy UE supporting 3GPP LTE, but the extended frequency resource cannot be used by the legacy UE. Therefore, the conventional data channel and control channel can be transmitted by using only the basic frequency resource.

Figure 16:
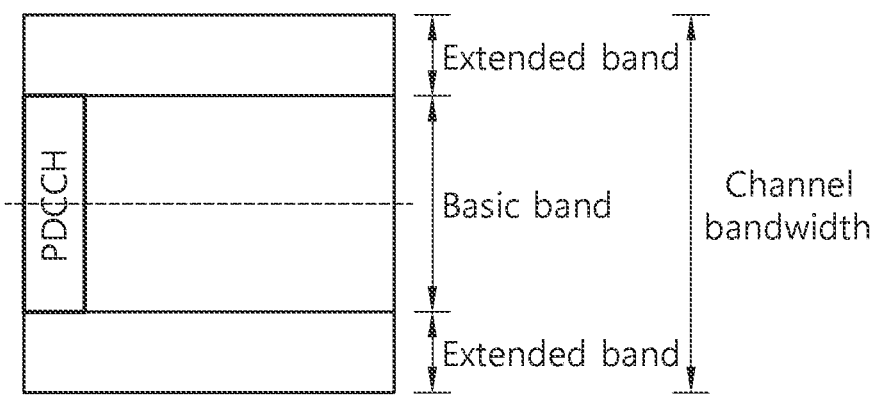
FIG. 16 shows an example of frequency resource expansion.

FIG. 16 shows an example of frequency resource expansion.

A channel bandwidth of a CC includes a basic band and at least one extended band.

The basic band is a band used by a legacy UE, and is compatible with 3GPP LTE. A control channel (i.e., a PDCCH) and data channel based on 3GPP LTE are transmitted in the basic band.

The extended band is also called a segment, and is not compatible with 3GPP LTE. The extended band includes at least one RB. An RB included in the extended band is called an additional RB to distinguish it from an RB included in the basic band. When a channel bandwidth includes 30 RBs, 25 RBs are included in the basic band and the remaining additional 5 RBs are included in the extended band.

Although it is shown that the extended band is arranged to the both sides of the basic band for example, a location and size of the extended band are not limited thereto.

The extended band is an expansion of a CC, and is related to one CC. Since system information or a synchronization signal for the extended band is unnecessary, system overhead can be decreased. A control channel may not be transmitted in the extended band. The extended band cannot be used for random access or cell selection/reselection.

Figure 17:
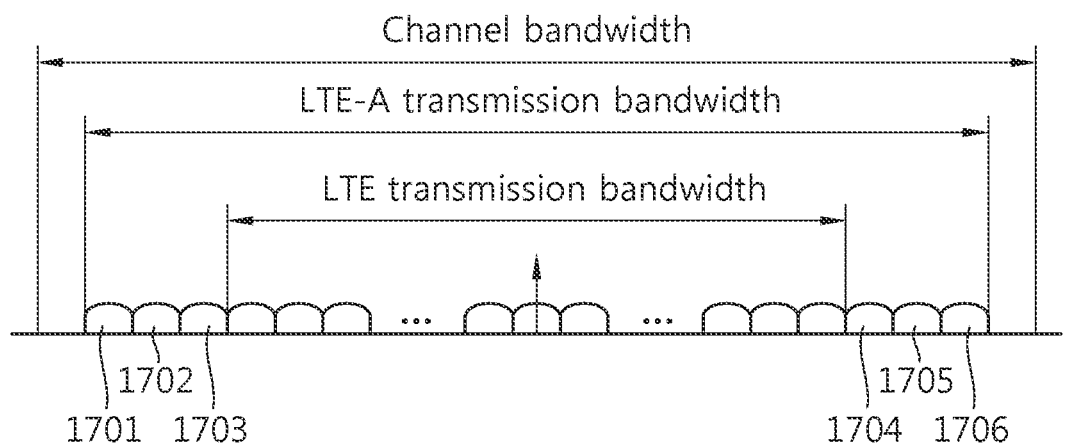
FIG. 17 shows another example of frequency resource expansion.

FIG. 17 shows another example of frequency resource expansion.

In 3GPP LTE, bandwidth utilization is 90%. In a channel bandwidth, a band other than a transmission bandwidth is used as a guard band. That is, 10% of the bandwidth is allocated to the guard band. For example, in a 20 MHz channel bandwidth, the transmission bandwidth supports 100 RBs except for the guard band.

However, it is considered to increase the bandwidth utilization to 90% or higher in LTE-A. Therefore, as shown in FIG. 17, in the same channel bandwidth, an LTE-A transmission bandwidth may be wider than an LTE transmission bandwidth. Accordingly, an additional RB can be obtained. For example, if the LTE transmission bandwidth includes 100 RBs, the LTE-A transmission bandwidth includes six additional RBs 1701, 1702, 1703, 1704, 1705, and 1706. As a result, 106 RBs are present in total.

This is similar to the frequency resource expansion of FIG. 16 when the LTE transmission bandwidth is used as a basic band and an additional RB is considered as an extended bandwidth.

Hereinafter, an RB belonging to a basic band recognized by a legacy UE is referred to as a conventional RB, and a newly added RB is referred to as an additional RB.

Meanwhile, 3GPP LTE-A allows discrete resource allocation by using clustered DFT-spread FDM transmission for effective resource scheduling of an uplink resource unlike the conventional 3GPP LTE that allows only continuous resource allocation in uplink transmission. This is to obtain flexibility of resource allocation even if a peak-to-average power ratio (PAPR) increases to some extent.

A bitmap scheme can be used for signaling of discrete resource allocation in uplink transmission. Alternatively, an RBG can be used to deliver additional information within a limited number of bits in order to support discrete allocation.

Figure 18:
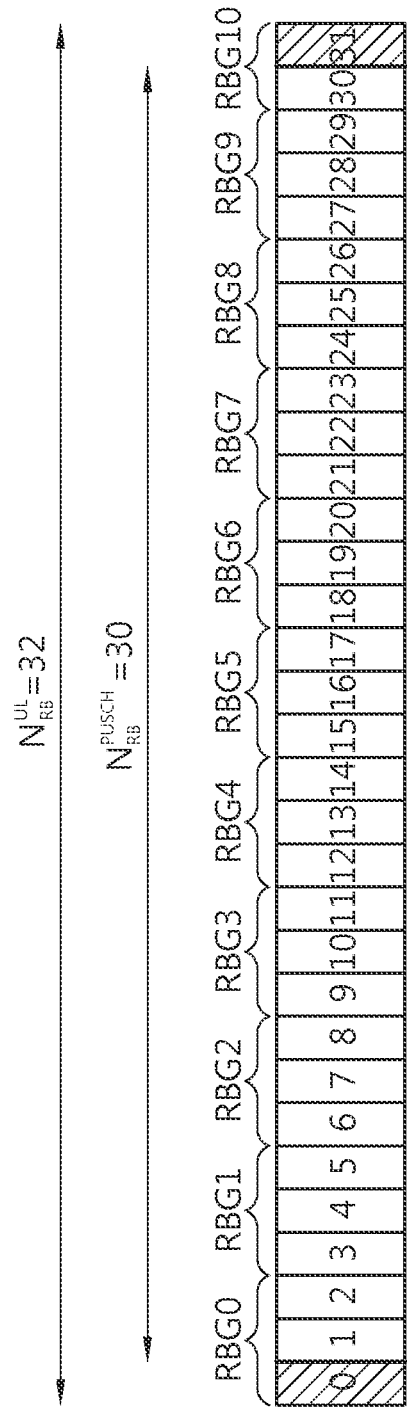
FIG. 18 shows uplink resource allocation using a resource block group (RBG).

FIG. 18 shows uplink resource allocation using an RBG. An RB indicated by a hatched line is an RB reserved for a PUCCH.

$N^{UL}_{RB}=32$, and RBs are indexed from 0 to 31. When an RBG size corresponds to 3 RBs, 11 RBGs can be included in a subframe. The RBs are grouped sequentially from an RB 0 according to the RBG size. An RBG 10 includes only 2 RBs (i.e., RB 30 and RB 31).

As described above, 3GPP LTE-A has an additional RB that cannot be recognized by a legacy UE. The additional RB can be used in PUSCH transmission.

In order to allocate the additional RB to the UE according to the type-2 VRB allocation method, there is a need to consider an RB belonging to a PUCCH region located between an addition RB and a conventional RB.

The PUCCH region is signaled by using a hopping offset $N^{HO}_{RB}$. The UE recognizes a region ranging from both ends of a basic band to ceil($N^{HO}_{RB}$/2) as the PUCCH region.

Figure 19:
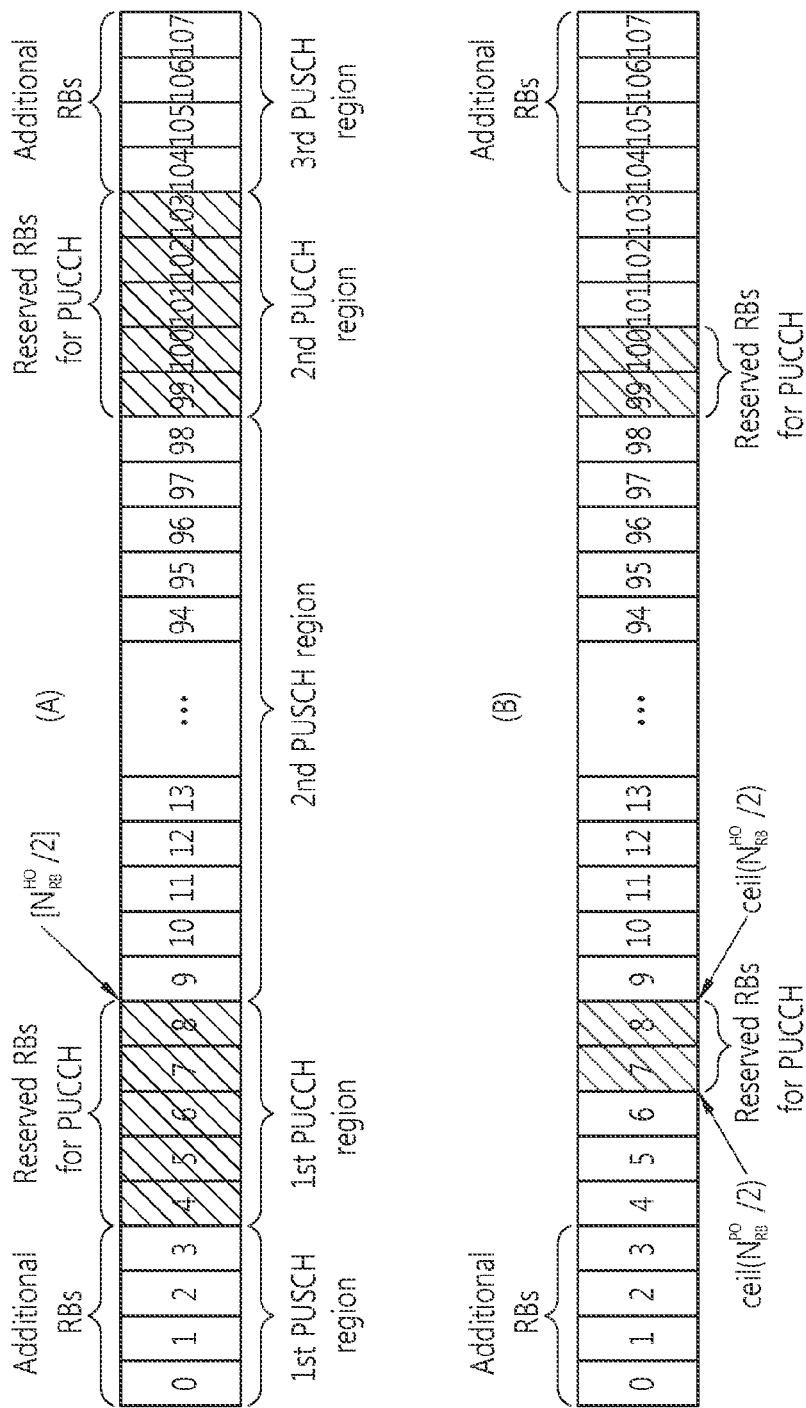
FIG. 19 shows a method of determining an additional resource block (RB) according to an embodiment of the present invention.

FIG. 19 shows a method of determining an additional RB according to an embodiment of the present invention. The number of conventional RBs recognized by a legacy UE is 100, and there are 4 additional RBs at each of both sides. However, the number of the conventional RBs and the number of the additional RBs are not limited thereto. 108 RBs are indexed from 0 to 107.

A $1^{st}$ PUCCH region, a $2^{nd}$ PUCCH region, and $1^{st}$, $2^{nd}$, and $3^{rd}$ PUSCH regions are present in a subframe. The $1^{st}$ and $3^{rd}$ PUSCH regions consist of additional RBs. The $1^{st}$ and $3^{rd}$ PUSCH regions may further include conventional RBs. The $2^{nd}$ PUSCH region consists of a conventional RB. The $1^{st}$ PUCCH region is arranged between the $1^{st}$ and $2^{nd}$ PUSCH regions. The $2^{nd}$ PUCCH region is arranged between the $1^{st}$ and $2^{nd}$ PUSCH regions.

In FIG. 19(A), a resource allocation of the conventional 3GPP LTE which knows existence of an additional RB is used to recognize an allocated RB.

A UE can know the number of additional RBs from a channel bandwidth. Therefore, a hopping offset $N^{HO}_{RB}$ indicates an offset from a start point (i.e., a $1^{st}$ conventional RB) of a PUCCH region similarly to the conventional 3GPP LTE.

Alternatively, the UE can receive information regarding the number of additional RBs from a BS.

In FIG. 19(B), a BS can report to a UE an additional offset $N^{PO}_{RB}$ indicating a start point of a PUCCH region so that an RB belonging to a conventional PUCCH can also be allocated to a PUSCH.

A PUCCH region of the conventional 3GPP LTE starts from a $1^{st}$ conventional RB (i.e., RB4), and is not changeable. However, the BS can report to the UE that the PUCCH region starts from RB7 by using an additional offset, and can allocate RB0 to RB6 to the PUSCH, thereby being able to provide flexibility of resource allocation.

An additional offset $N^{PO}_{RB}$ may be an offset value based on a $1^{st}$ RB (i.e., RB0), and in this case, $N^{PO}_{RB}$=12. Alternatively, it may be an offset value based on a last additional RB (i.e., RB3) or the $1^{st}$ conventional RB (i.e., RB4), and in this case, $N^{PO}_{RB}$=6.

Figure 20:
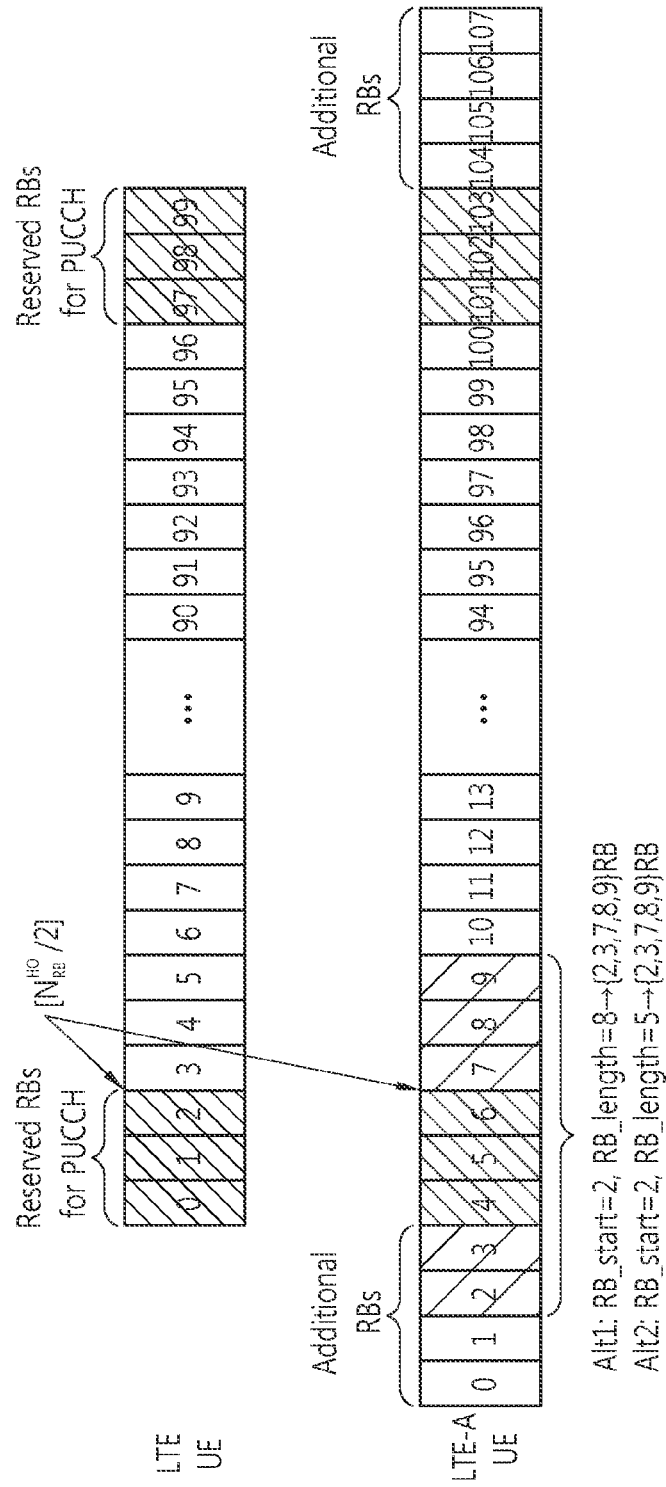
FIG. 20 shows a resource allocation method according to an embodiment of the present invention.

FIG. 20 shows a resource allocation method according to an embodiment of the present invention. In this method, a type-2 VRB allocation is applied to an uplink allocation.

Four additional RBs are present at each of both ends. RBs are indexed from 0 to 107. RBs reserved for a PUCCH are conventional RBs {4, 5, 6, 101, 102, 103}.

The type-2 VRB allocation is defined with RB_start (i.e., a start point) and RB_length (i.e., the number of continuous RBs). In this case, according to whether the number of RBs belonging to the PUCCH region (i.e., a size of the PUCCH region) is included in the value RB_length, it can be interpreted as at least one of two methods as follows.

First, even if RB_length includes the number of RBs belonging to the PUCCH region, the UE can determine the number of RBs by excluding the RBs belonging to the PUCCH region. Assume that RBs {2, 3, 7, 8, 9} are allocated to the UE for PUSCH transmission. In this case, the above parameters are given by RB_start=2 and RB_length=8, and the UE recognizes that RBs remaining after excluding the RBs {4, 5, 6} reserved for the PUCCH are allocated.

Second, RB_length does not include the number of RBs belonging to the PUCCH region. RB_length indicates the number of RBs actually allocated by excluding the PUCCH region. When the above parameters are given by RB_start=2 and RB_length=5, the UE skips RBs {4, 5, 6} belonging to the PUCCH region and recognizes that RBs {2, 3, 7, 8, 9} are allocated.

Figure 21:
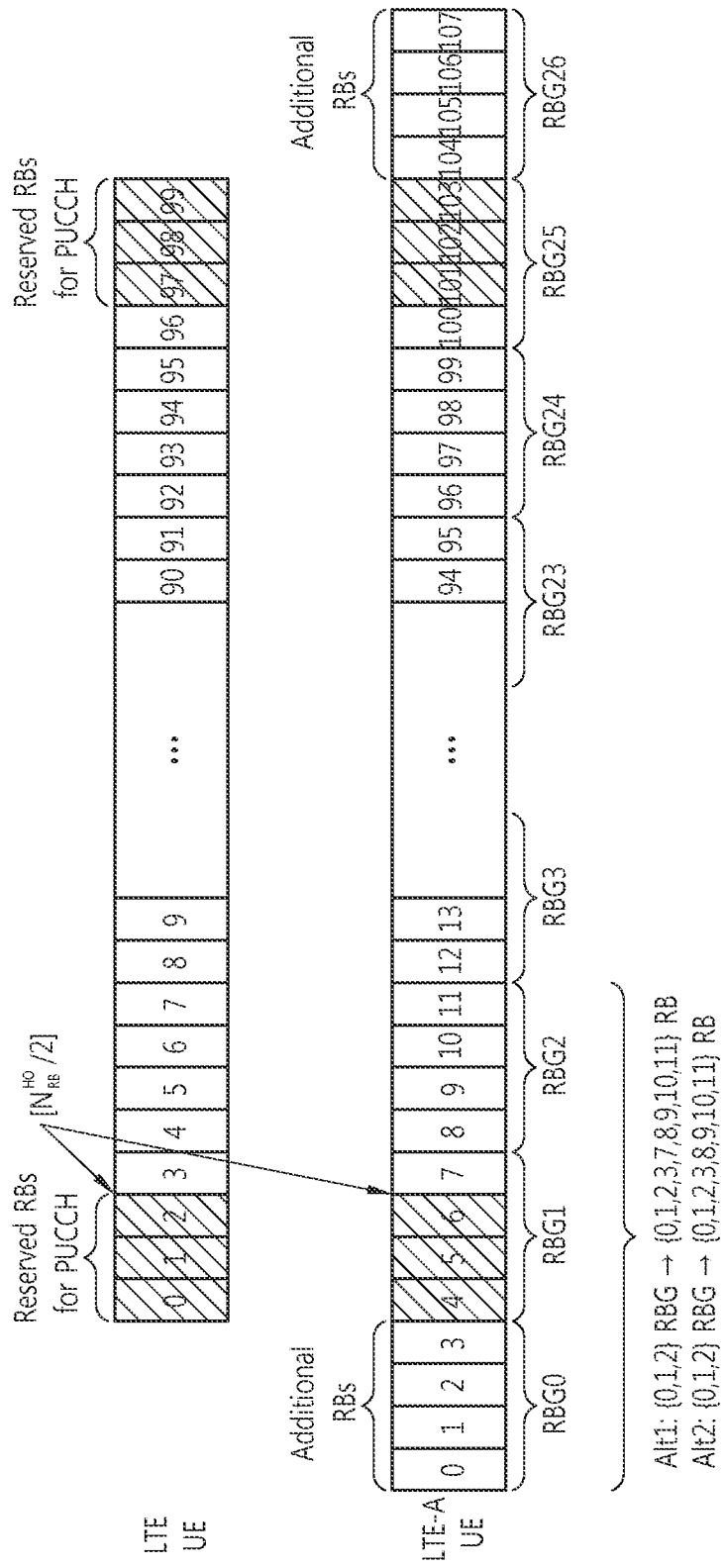
FIG. 21 shows a resource allocation method according to an embodiment of the present invention.

FIG. 21 shows a resource allocation method according to an embodiment of the present invention. In this method, an RBG is used for an uplink, and a type-0 VRB allocation is applied to uplink allocation.

Assume that RBGs {0, 1, 2} are allocated by using a bitmap. In this case, a UE can recognize an allocated RB by using at least one of two methods as follows.

First, the UE can recognize that RBs {0,1,2,3,7,8,9,10,11} remaining after excluding RBs {4,5,6} reserved for the PUCCH are allocated.

Second, the UE can exclude all RBs of an RBG including RBs belonging to a PUCCH region. This is to satisfy the resource allocation condition of Radix-2,3,5. An RBG size is defined to 2, 3, or 4 according to a frequency band, which satisfies the Radix-2,3,5. For example, when RBGs {0,1,2} are allocated by using a bitmap, the UE recognizes that RBs {0,1,2,3,8,9,10,11} belonging to the RBGs {0,2} remaining after excluding the RBG1 are allocated. Herein, the RBG1 includes RBs {4,5,6} reserved for the PUCCH.

Figure 22:
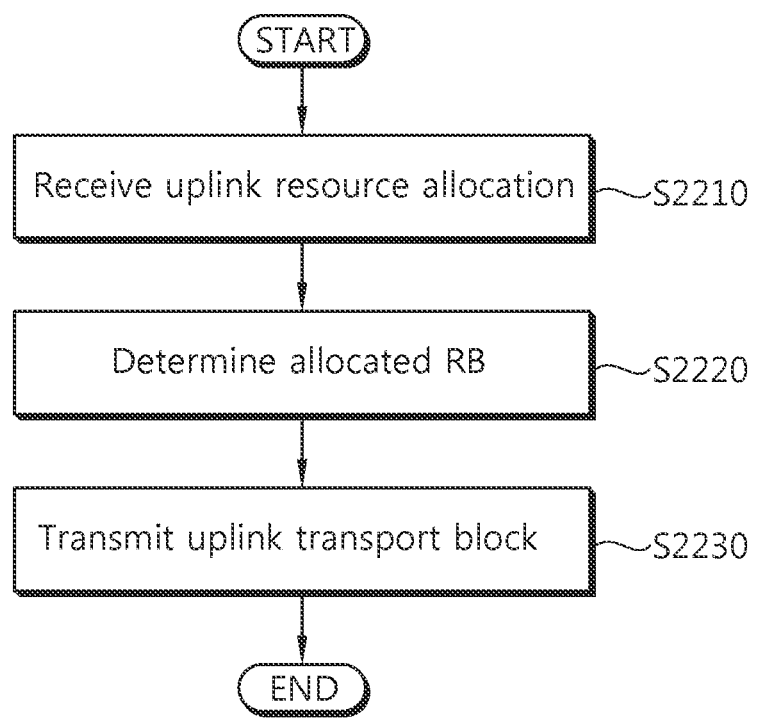
FIG. 22 is a flowchart showing an uplink transmission method according to an embodiment of the present invention.

FIG. 22 is a flowchart showing an uplink transmission method according to an embodiment of the present invention.

A UE receives an uplink resource allocation from a BS (step S2210). A subframe is split into at least one PUCCH region for a PUCCH and a plurality of PUSCH regions for a PUSCH. The PUCCH region is arranged between the plurality of PUSCH regions. A first PUSCH region and a last PUSCH region are configured with an additional RB.

The UE determines the allocated RB from the uplink resource allocation (step S2220). According to the resource allocation method described with reference to FIG. 18 to FIG. 20, the UE can determine the allocated RB.

The UE transmits an uplink transport block on a PUSCH by using the allocated RB (step S2230).

Figure 23:
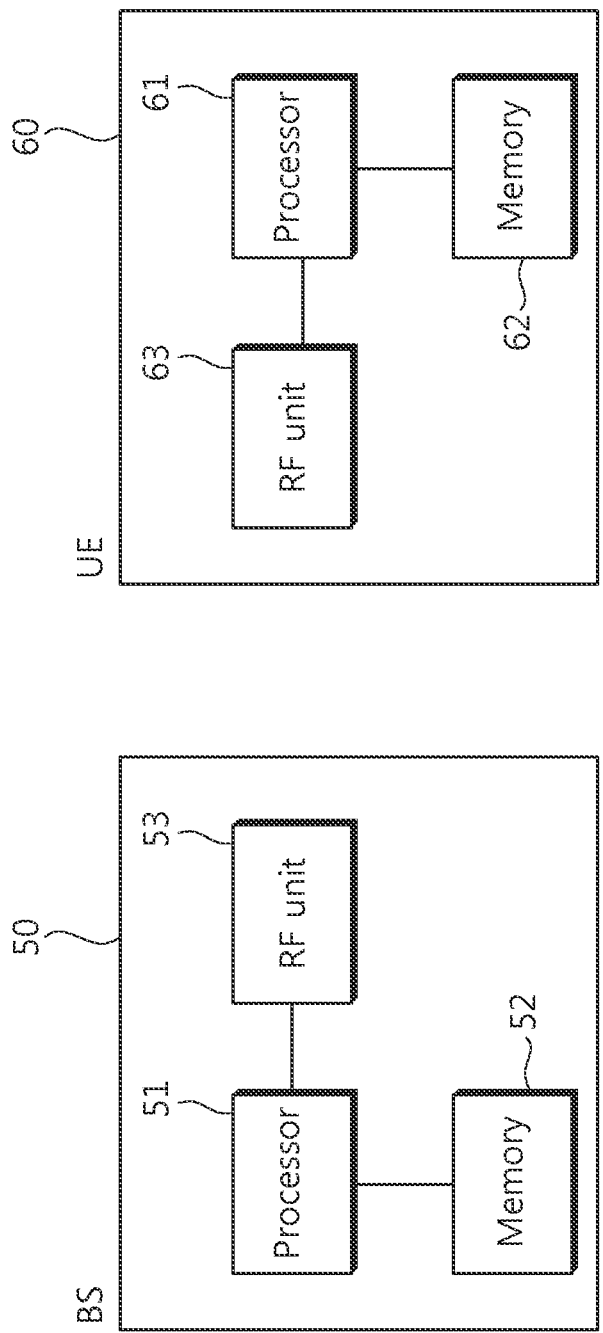
FIG. 23 is a block diagram showing a wireless communication system according to an embodiment of the present invention.

FIG. 23 is a block diagram showing a wireless communication system according to an embodiment of the present invention.

A BS 50 includes a processor 51, a memory 52, and a radio frequency (RF) unit 53.

The processor 51 implements the proposed functions, procedures, and/or methods. An operation of the BS can be implemented by the processor 51 in the aforementioned examples of FIG. 18 to FIG. 21. The processor 51 can determine a VRB allocation for indicating a VRB allocated to a UE, and can report the allocated VRB to the UE by using an uplink resource allocation.

The memory 52 coupled to the processor 51 stores a parameter or protocol for the operation. The RF unit 53 coupled to the processor 51 transmits and/or receives a radio signal.

A UE 60 includes a processor 61, a memory 62, and an RF unit 63.

The processor 61 implements the proposed functions, procedures, and/or methods. An operation of the UE can be implemented by the processor 61 in the aforementioned examples of FIG. 18 to FIG. 21. The processor 61 receives an uplink resource allocation, and determines an allocated RB. The processor 61 transmits an uplink transport block on a PUSCH determined from the allocated RB.

The memory 62 coupled to the processor 61 stores a parameter or protocol for the operation. The RF unit 63 coupled to the processor 61 transmits and/or receives a radio signal.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be placed inside or outside the processor and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

The above-described embodiments include various aspects of examples. Although all possible combinations for describing the various aspects may not be described, those skilled in the art may appreciate that other combinations are possible. Accordingly, the present invention should be construed to include all other replacements, modifications, and changes which fall within the scope of the claims.

The invention claimed is:

1. An uplink transmission method in a wireless communication system, the method performed by a user equipment and comprising:
  receiving an uplink resource allocation from a base station (BS); and
  transmitting an uplink transport block on a physical uplink shared channel (PUSCH) by using the uplink resource allocation,
  wherein the uplink resource allocation indicates at least one allocated resource block (RB) in an uplink subframe including a plurality of RBs, the plurality of RBs comprising basic RBs and additional RBs in order to extend a bandwidth,
  wherein the uplink subframe is split into at least one physical uplink control channel (PUCCH) region for a PUCCH and a plurality of physical uplink shared channel (PUSCH) regions for a PUSCH, the PUCCH region arranged between the plurality of PUSCH regions, and
  wherein a first PUSCH region of the plurality PUSCH regions includes the additional RBs and a second PUSCH region of the plurality PUSCH regions includes the basic RBs.

2. The method of claim 1, further comprising:
  receiving a hopping offset from the BS that indicates a size of the PUCCH region.

3. The method of claim 2, further comprising:
  receiving an additional offset from the base station that indicates a start point of the PUCCH region.

4. The method of claim 1, wherein the uplink resource allocation includes a resource indication value (RIV) indicating a number of the at least one allocated RB and a start point of the at least one allocated RB.

5. The method of claim 4, wherein the number of the at least one allocated RB includes a number of RBs belonging to the PUCCH region.

6. The method of claim 4, wherein the number of the at least one allocated RB does not include a number of RBs belonging to the PUCCH region.

7. The method of claim 1, wherein:
  the plurality of RBs are grouped in units of a resource block group (RBG); and
  the uplink resource allocation indicates allocated RBGs.

8. The method of claim 7, wherein the at least one allocated RB comprises RBs remaining after excluding an RB belonging to the PUCCH region from RBs belonging to the allocated RBGs.

9. The method of claim 7, wherein the at least one allocated RB comprises RBs remaining after excluding an RBG including RBs belonging to the PUCCH region from the allocated RBGs.

10. A user equipment comprising:
  a radio frequency (RF) unit for transmitting and receiving radio signals; and
  a processor operatively coupled to the RF unit for performing uplink transmission and configured to:
  control the RF unit to receive an uplink resource allocation from a base station (BS); and
  control the RF unit to transmit an uplink transport block on a physical uplink shared channel (PUSCH) by using the uplink resource allocation,
  wherein the uplink resource allocation indicates at least one allocated resource block (RB) in an uplink subframe including a plurality of RBs, the plurality of RBs comprising basic RBs and additional RBs in order to extend a bandwidth,
  wherein the uplink subframe is split into at least one physical uplink control channel (PUCCH) region for a PUCCH and a plurality of physical uplink shared channel (PUSCH) regions for a PUSCH, the PUCCH region arranged between the plurality of PUSCH regions, and
  wherein a first PUSCH region of the plurality PUSCH regions includes the additional RBs and a second PUSCH region of the plurality PUSCH regions includes the basic RBs.

11. The user equipment of claim 10, wherein the uplink resource allocation includes a resource indication value (RIV) indicating a number of the at least one allocated RB and a start point of the at least one allocated RB.

12. The user equipment of claim 10, wherein:
  the plurality of RBs are grouped in units of a resource block group (RBG; and
  the uplink resource allocation indicates allocated RBGs.

13. The user equipment of claim 12, wherein the at least one allocated RB comprises RBs remaining after excluding an RB belonging to the PUCCH region from RBs belonging to the allocated RBGs.

14. The user equipment of claim 12, wherein the at least one allocated RB comprises RBs remaining after excluding an RBG including RBs belonging to the PUCCH region from the allocated RBGs.

15. The user equipment of claim 10, wherein the processor is further configured to control the RF unit to receive a hopping offset from the BS that indicates a size of the PUCCH region.

16. The user equipment of claim 15, wherein the processor is further configured to receive an additional offset from the BS that indicates a start point of the PUCCH region.

17. A base station comprising:
a radio frequency (RF) unit for transmitting and receiving radio signals; and
a processor operatively coupled to the RF unit for allocating an uplink resource and configured to:
determine at least one allocated resource block (RB) in an uplink subframe including a plurality of RBs; and
transmit an uplink resource allocation related to the at least one allocated RB to a user equipment (UE),
wherein the uplink resource allocation indicates at least one allocated resource block (RB) in an uplink subframe including a plurality of RBs, the plurality of RBs comprising basic RBs and additional RBs in order to extend a bandwidth,
wherein the uplink subframe is split into at least one physical uplink control channel (PUCCH) region for a PUCCH and a plurality of physical uplink shared channel (PUSCH) regions for a PUSCH, the PUCCH region arranged between the plurality of PUSCH regions, and
wherein a first PUSCH region of the plurality PUSCH regions includes the additional RBs and a second PUSCH region of the plurality PUSCH regions includes the basic RBs.

18. The base station of claim 17, wherein:
the plurality of RBs are grouped in units of a resource block group (RBG; and
the uplink resource allocation indicates allocated RBGs.

19. The method of claim 17, wherein the uplink resource allocation includes a resource indication value (RIV) indicating a number of the at least one allocated RB and a start point of the at least one allocated RB.

* * * * *